United States Patent [19]
Walsh et al.

[11] Patent Number: 6,144,848
[45] Date of Patent: Nov. 7, 2000

[54] HANDHELD REMOTE COMPUTER CONTROL AND METHODS FOR SECURED INTERACTIVE REAL-TIME TELECOMMUNICATIONS

[75] Inventors: Joseph F. Walsh, Lynnwood, Wash.; David H. Boydston, Goleta, Calif.

[73] Assignee: Weiss Jensen Ellis & Howard, Seattle, Wash.

[21] Appl. No.: 08/657,892

[22] Filed: Jun. 7, 1996

Related U.S. Application Data

[63] Continuation-in-part of application No. 08/482,261, Jun. 7, 1995, abandoned, and a continuation-in-part of application No. 08/485,083, Jun. 7, 1995, abandoned, and a continuation-in-part of application No. 08/480,614, Jun. 7, 1995, Pat. No. 5,696,824.

[51] Int. Cl.[7] .......................... H04Q 7/20; H04M 11/00; H04M 11/06; H04L 9/00
[52] U.S. Cl. ..................... 455/419; 455/403; 455/414; 455/418; 455/422; 235/379; 235/380; 235/472; 340/825.35; 379/102.01; 379/106.01; 380/255; 380/257; 380/270; 380/287; 705/50; 705/64; 705/73; 713/150; 713/153; 713/189
[58] Field of Search ...................................... 235/375, 379, 235/380, 462, 472; 340/825.29, 825.34, 825.35, 825.44, 825.31; 380/9, 23, 24, 25, 49, 50, 54, 59, 247, 255, 257, 270, 271, 277, 278, 287; 359/142, 143, 144, 145, 146, 147, 148; 379/102.01, 102.06, 106.01, 106.09, 106.11; 455/403, 410, 411, 414, 418, 419, 420, 422; 705/50, 64, 73; 713/150, 151, 153, 182, 189, 200, 201

[56] References Cited

U.S. PATENT DOCUMENTS

| | | |
|---|---|---|
| 4,471,218 | 9/1984 | Culp . |
| 4,516,016 | 5/1985 | Kodron . |
| 4,569,421 | 2/1986 | Sandstedt . |
| 4,797,920 | 1/1989 | Stein . |
| 4,857,716 | 8/1989 | Gombrich et al. . |
| 4,947,028 | 8/1990 | Gorog . |
| 4,961,220 | 10/1990 | Tentler et al. . |
| 4,978,305 | 12/1990 | Kraft . |
| 4,988,849 | 1/1991 | Sasaki et al. . |
| 5,109,222 | 4/1992 | Welty ................................ 359/142 X |
| 5,204,768 | 4/1993 | Tsakiris et al. ......................... 359/148 |
| 5,221,838 | 6/1993 | Gutman et al. . |
| 5,324,922 | 6/1994 | Roberts . |
| 5,340,966 | 8/1994 | Morimoto . |
| 5,347,646 | 9/1994 | Hirosawa et al. ............. 379/102.01 X |
| 5,365,050 | 11/1994 | Worthington et al. . |
| 5,365,577 | 11/1994 | Davis et al. . |
| 5,465,291 | 11/1995 | Barrus et al. . |
| 5,483,052 | 1/1996 | Smith et al. . |

FOREIGN PATENT DOCUMENTS

PCT/US92/
03049  10/1992  WIPO .

*Primary Examiner*—Bernarr E. Gregory
*Attorney, Agent, or Firm*—Weiss Jensen Ellis & Howard

[57] ABSTRACT

An interactive bi-directional telecommunication method using a handheld low power user device to access a host computer server along a telecommunication path, and to command the host computer server to transmit audio and/or visual reports to the user device. A system for host computer ordering of consumer products and services using the telecommunications method and handheld low power user device.

77 Claims, 16 Drawing Sheets

HANDHELD REMOTE COMPUTER CONTROL AND METHODS FOR SECURED INTERACTIVE REAL-TIME TELECOMMUNICATIONS

This application is a continuation-in-part application of U.S. application Ser. Nos. 08/482,261, now abandoned, 08/485,083, now abandoned, and 08/480,614, now U.S. Pat. No. 5,696,824, all three applications filed on Jun. 7, 1995 and all three applications incorporated herein by reference.

FIELD OF THE INVENTION

The invention relates to a handheld remote control wand having bar code, sound, voice and visual telecommunication systems for controlling a host computer server.

BACKGROUND OF THE INVENTION

In the emerging Internet era, communications between personal computers (PCs) is becoming routine. However, problems remain to be solved, foremost among which are ease of use and access and portability of communication equipment. While desk and laptop PCs offer telecommunications access to a variety of different server networks, commonly any exchange of information between the user and server is conducted in the public domain, i.e., on one big "party line" where ease-dropping and data manipulation can occur. While suitable for recreational use, this is not suitable for most business activities. While modem or facsimile communications between PCs may be more secure, they suffer from other disadvantages in that communication is commonly restricted to textual and/or graphic materials and do not usually allow simultaneous voice or sound content. Likewise, telephone conversations commonly involve voice without textual or graphic support. While multimedia communication systems may be available for use in a presentation conference room setting, they often involve expensive and/or bulky equipment that is not easily portable.

In everyday personal and business life there are many times when it would be desirable communicate on a real-time secure basis, and in a multimedia manner, e.g., with the main office, in a secure manner.

Advertising sales and marketing materials are commonly distributed using a print media, such as newspapers, magazines, brochures and catalogs. On the one hand, these media can have advantages of low cost, ease of distribution, and sales effectiveness. However, on the other hand, print media are relatively inflexible as a method of communication. Copy is often directed towards the "average buyer", in the full recognition that such an individual may not exist, and with limited provision for an alternative presentation other than launching several different expensive ad campaigns. Printed copy provides no opportunity for questions, or interaction between the writer and the person reading the copy. Print media is also weak at the actual point of order entry. At best, a printed advertisement can offer a mail or FAX order form; or, it can direct a potential buyer to a telephone number for placing an order. Tele-marketing is similarly non-interactive and considered by many potential buyers to be intrusive. It is, therefore, considered ineffective for most products.

Methods for order entry using a bar code reader include transmittal of data to a host processor, but are not presently believed to include methods for presentation of information to a customer at a handheld unit in a multimedia format, or in real time.

U.S. Pat. No. 4,947,028, "Automated Order and Payment System", issued Aug. 7, 1990, in the name of Jonathan M. Gorog and assigned to Arbor-International, Inc. (Gorog), shows a limited automated order and payment system. An order is entered at an "Order Computer Terminal" using a keyboard and/or a bar code reader to communicate with a central computer system where credit information is verified and instructions are sent back to the order entry terminal to print or display an order verification for the user. While this system generally achieves a purpose of order entry, it suffers from being little more than a re-packaged personal computer (PC). Attendant disadvantages of the system are numerous, foremost being expense and lack of portability. Disclosed systems in Gorog also do not include methods to allow rapid presentation of voice information to a customer interactively, or in real-time, or using a handheld portable unit to accomplish the methods disclosed. (In the latter case, the system does not have a voice/data modem, nor low power circuitry or power management, nor a communications protocol to achieve voice and data on ordinary telephone lines while managing power usage.)

U.S. Pat. No. 5,221,838, "Electronic Wallet", issued Jun. 22, 1993, in the name of Jose Gutman et al. and assigned to Motorola, Inc., discloses an "electronic wallet" for storing a bank balance and for receiving a radio message to update the balance. The system apparently updates the balance in memory in response to data entered by the user. Included are a user terminal with keyboard, magnetic card reader, bar code reader, display screen and printer. However, the system is really little more than a re-packaged PC, drawing power from a 110 V wall outlet (or from large bulky batteries), without ease of portability, and without capability for multimedia real-time interactive bi-directional communication with an automated order center computer. In short, the attendant disclosure does not seem to disclose interactive multimedia real-time presentation of information to a user.

U.S. Pat. No. 5,365,577, "Telecommunication Display System", issued Nov. 15, 1994, in the name of Richard A. Davis et al. and assigned to Radish Communications Systems, Inc., shows a telecommunication system that can reportedly be dynamically switched between voice mode and data mode in the course of a single telephone call. But this system suffers from the disadvantage that it requires "smart" PCs, and involves in methods for "peer-to-peer" communications generally involving an interrupted voice conversation between two parties. The system seems to involve directional couplers that also add expense. The two peer PCs each require power from a 110 V wall outlet, (or large bulky batteries); and, are not easily handheld.

U.S. Pat. No. 5,465,291, "Apparatus for Ordering From Remote Locations", issued Nov. 7, 1995 in the name of Barrus et al. (Barrus) discloses a method for transmitting user information to a remote computer in a dual-tone multiple frequency (DTMF) "touch tone" format that suffers not including a way to accomplish bi-directional communication such as needed for transmitting data for display by a user. Also missing, are ways to check for errors in transmission, or to encrypt user sensitive data, or ways to receive confidential data from a host computer for display in a protected manner, or ways to protect confidential information. In addition, DTMF systems suffer from at least the general disadvantages of failing to encode self-correcting error-free telecommunication signals; and, being a relatively slow method for transmission of data. Approximately 0.1 seconds being required for each different integer and 0.2 seconds for each alpha character encoded by a DTMF tonal pair using 50 milliseconds "on" followed by 50 milliseconds "off" for each character digit. This is excessively slow for transmission of bar code data. For example, a 16 digit code requires approximately 1.6 seconds just for transmission and decoding at a server while a 16 alpha character code requires 3.2 seconds.

Accordingly, it would be advantageous have an error-free, secure, bi-directional communication method to provide an ordering and advertising system that could be used within a printed media that would non-intrusively allow an interested party to obtain additional information in an interesting and interactive manner, without the intervention of a sales person, and in an automated hands-off secure manner that might result in entry of a bank card sale. In addition, it would be advantageous to have a system for telecommerce that would offer error-free, secure, optionally-encrypted communications and with storage of sensitive confidential data in a secure location.

SUMMARY OF THE INVENTION

The invention provides a telecommunications device for secure, encrypted, interactive multimedia communication, in real-time between a central processing unit (CPU) in a host computer server (host server). The device is low power and handheld, and it contains an audio system, microphone, speaker, keypad, display screen, bar code reader, microprocessor, and telecommunications transceiver (with modem, voice processor, call progress monitor, bi-directional voice/data mixer, DTMF (or MF) signal generator and an optional codec unit). The device maintains its low power status by drawing power for all functions (i.e., less than about 300 milliwatts of power and preferably less than about 150 mw) from a convenient telephone wall jack or a wireless telephone battery. The disclosed unit is a relatively inexpensive to manufacture having a microprocessor with simple less than about 128 K bytes of PROM and 8 K bytes of RAM. Although relatively "dumb" when compared with a PC, interactive error-free, bi-directional, real-time telecommunications allow the device to transparently behave like a sophisticated "super computer", in this case, the host server.

The user device is highly versatile and provides simple, rapid, secure and encrypted, self-correcting, error-free, inexpensive, handheld unit to access, control, instruct, command, and query a host server. A user "in the field" (e.g., a customer) can enter command messages (including bar coded messages) directing the host server to supply information on a real-time, interactive basis including multimedia information such as text, data, calculations, reports, voice, sound, music and graphic information. Commands can also be transmitted to the host server to take actions, e.g., access files, make calculations, provide quotations, investigate and provide credit/debit information or credit history, enter orders for products, and the like. Security provisions and encryption installed in the handheld user device allow it to interactively obtain confidential business information and place credit card orders. While the handheld user device contains a relatively simple microprocessor the telecommunications data packets transmitted from the handheld user device to the host server have capability for multimedia content.

The maximal power budget (i.e. less than about 300 milliwatts and preferably less than about 150 mw) can easily be consumed by the transceiver, or bar code reader in the absence of management and control. Power management and conservation protocols within the user device include three different methods for expediting and controlling telecommunications to save power. First, bar coded data packets (i.e., from scanning printed bar codes) are used to direct commands to the host server allowing: (i) faster entry; (ii) faster encoding and encryption; (iii) faster transmission; and, (iv) lower power consumption. Second, during telecommunications with the host server the user device is the "master" (not the slave) and thus is able to selectively supply current to only the hardware components that are necessary for the instantaneous form of communication with the server, i.e., voice, visual or data. (When they are not needed the respective hardware components are immediately powered down to save power.) Third, rapid communication "signal switching" is provided by using data packets that contain DTMF (or MF) "switch signal" codes. The latter "switch signal" codes are capable of instructing a host server e.g. (a) to switch voice "off" and data communications "on"; and, (b) select communication parameters (e.g., set baud to 1200, set parity to Even); all in less than 0.15 seconds.

Attendant advantages to "switch signal" codes in the user device include: (i) multimedia transmissions within a simultaneous telecommunication transmission (e.g., from voice to bar code data then to keystroke data then back to voice); (ii) faster interactive communications between the user and server; (iii) elimination of power intensive time consuming (i.e., 10 second) modem negotiations required to set communication parameters; and, (iv) power savings by allowing the user device to control the course of the telecommunication session and power-down unused hardware. Interactive telecommunications between the user device and host server can be very fast but also very complex. As an example, the user device may encode and transmit a data packet having the following order of instructions: namely, (i) switch signal (e.g., turn voice off, turn data on, set communication parameters, receive data); (ii) command bar code (e.g., "order the following item"); (iii) UPC bar code (e.g., "product to be ordered"); (iv) command bar code (e.g., "two units of the bar coded item"); (iv) "switch signal" (e.g. from data to voice, switch on voice recorder, and receive incoming voice message); (v) "voice message" (e.g., 'don't deliver at the backdoor, the dog bites'.) Following receipt of the command message, the host server may signal an acknowledgment to the user, e.g., an audio message, an update to the screen display, or alternatively, the server may transmit a facsimile (FAX)-response, i.e., to a FAX machine at the user's location. The FAX message may optionally contain a set of command bar codes, capable of generating additional command messages, to further expedite telecommunications in the interactive loop between the user device and the server.

DETAILED DESCRIPTION OF THE PREFERRED EMBODIMENT

Figure 1A:
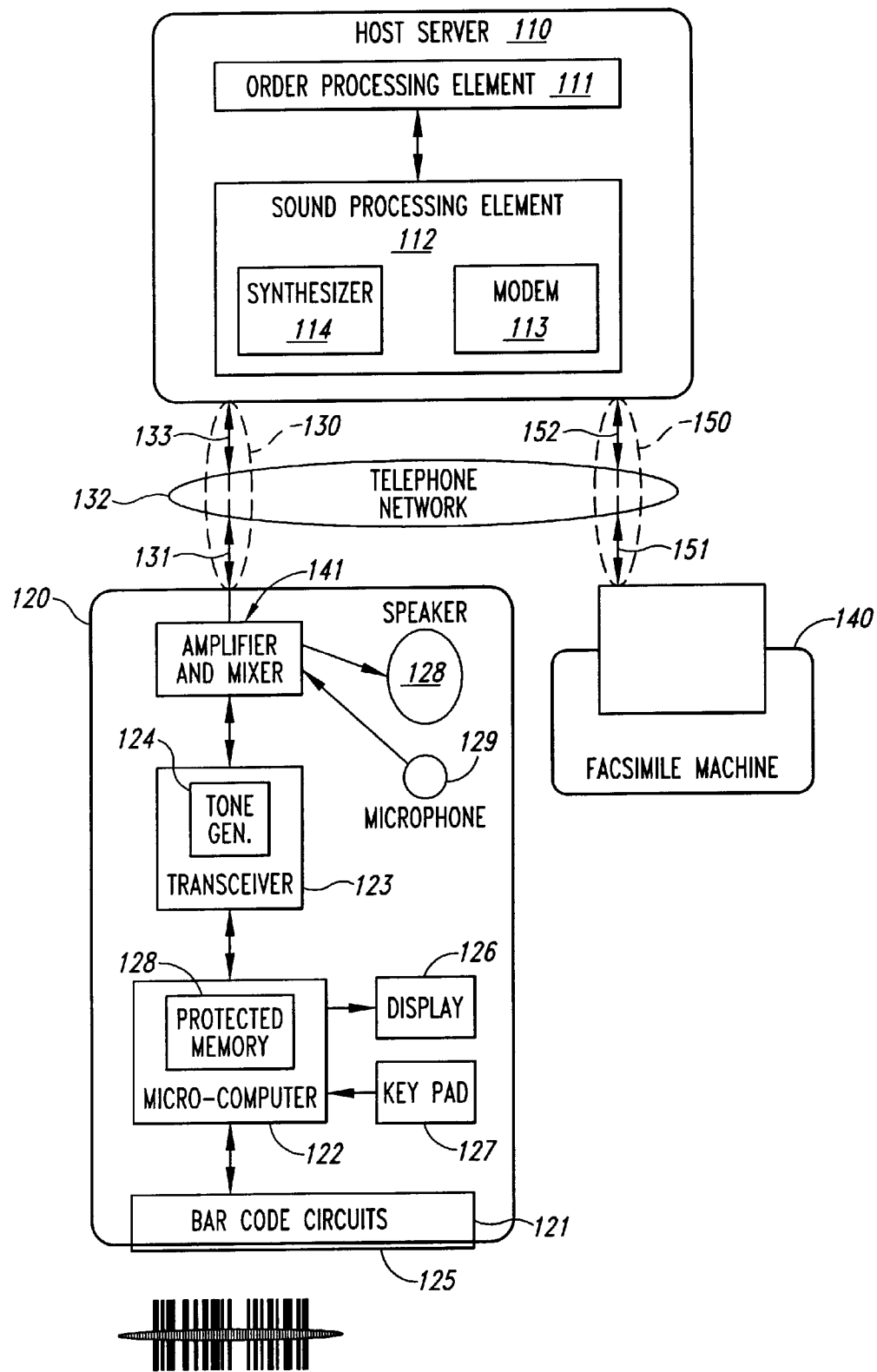
FIG. 1A depicts telecommunication between a user device (according to the disclosure below) and a host server.

The methods of the invention are highly versatile and find uses in a variety of consumer, business and private settings. Aspects of the invention include e.g. methods for the following: namely, a method for commanding a host server to transmit voice, sound, data, alphanumeric and/or graphic displays, and the like, as informational messages to a handheld low power user device; by transmitting a command message data packet; in an error-free fashion, with modem communication protocols, from the user device to the host server; where the data packet includes (but is not limited to) bar coded command instructions and keystroke data;

a method for using DTMF or MF 'switch signal' to instruct a host server to switch a communications path from voice mode to data mode, and to provide compatibility with an ADSI server;

a method for transparently initiating telecommunication with a host server using a bar code reader in a low power handheld user device to initiate the link;

a method for establishing a bi-directional, secured, confidential, private and error-free telecommunication path to a host server and for commanding the host server along that communication path to encode, encrypt and transmit sensitive information in a secure manner to a host handheld low power user device, a method for transmitting multimedia presentations (i.e., optionally. encrypted data, voice, numerical, and/or graphic information) along an error-free path to a handheld low power user device;

a method for encoding, encrypting and transmitting multimedia presentations from a handheld low power user device to a host server;

a method for transmitting long complex command program instructions to a host server using one or more bar coded commands that are encoded into a short command message;

a method for transmitting multilingual multimedia presentations to a handheld user device;

a method for using a low power handheld user device to access a host server and transmitting thereto command messages (optionally encrypted) containing digital telecommunication signals, voice, keystrokes;

a method for establishing a telecommunication link between a host server and a handheld user device which intermittently draws small amounts of current from either a telephone-loop power supply, or from a wireless telephone battery, without interfering with the telecommunication link or significantly reducing battery life cycle; and, a method for establishing an interactive multimedia real-time telecommunication link between a host server and a handheld low power user device.

a method for securing confidential information such as credit card numbers, account balance information, and encryption parameters, (i.e., from thieves) by storing the subject information in a protected memory in the subject user device.

In the accompanying disclosure, a presently preferred embodiment of the invention is described with regard to preferred hardware, process steps and data structures. However, those skilled in the art will recognize that certain substitutions and/or alterations may be made without departing from the spirit and scope of the present invention. The present invention may be used in conjunction with inventions disclosed in the inventor's U.S. Ser. Nos. 08/480,614, now U.S. Pat. No. 5,696,824, and 08/485,083, now abandoned, both filed Jun. 7, 1995 and both incorporated herein by reference.

Overview of the Method and System

Disclosed herein are methods for multimedia communication using a low power, portable, lightweight, handheld, relatively inexpensive user device powered by a telephone line or wireless phone, that does not require a user PC, or a "peer-to-peer" communication system. The subject device does not contain user software and is easy to install by simply plugging it into a telephone wall jack, or into a cell phone access port. A comparison between the handheld low power user device of the invention and a desktop PC is provided in TABLE A, below.

TABLE A

| Hardware Component | Illustrative PC | Handheld Low Power User Device | Comparison** |
|---|---|---|---|
| RAM | 8–16Mb | <8Kb | <0.01% |
| Processor | 32–64 bits 10–14 watts | 8 bits 50 mw | <1% |
| User Software | Assorted | None | None |
| Drive(s) | Hard drive(s) Floppy drive(s) CDROM drive(s) | None | None |
| Modem | 2000–3000 mw | 15–50 mw | <2% |
| Bar Code Reader | External (2–3 amps) | Internal <20ma | <0.1% |
| Monitor/Screen | 100 watts | <50 milliwatts | <0.1% |
| Power Supply | 250 watts | <300 millliwatts | 0.1% |

**Comparison User Device Specification/Illustrative Specification x 100%

Embodiments of the invention provide a data and voice communication system using a low power user device that derives power from either a telephone loop-line current or a wireless telephone battery. The user device draws power at such a low level that it operates without interfering with voice or data telecommunication systems, e.g., it does not trigger a "wink start" signal or other supervisory telecommunication signal. The subject user device contains an internal bar code reader and method for managing voice and data communications to and from a host server and involving bi-directional voice and data telecommunication over ordinary telephone lines.

In other embodiments the invention provides a user with a highly portable system for transmitting, on ordinary phone lines, voice and data signals via telecommunication circuits to a host server.

In other embodiments the invention provides a method for transmitting data signals, bar code informational and voice communication on a single telecommunication channel by initiating a transmission with a DTMF or MF "switch signal" code, followed by a data packet. The "switch signal" instructs the host computer system to turn off voice messages and enable modem communications and receive data packets. Data packets may include data, bar code information, command instructions (i.e., instructions from the user device to the host server), keystrokes and/or optional voice messages. In alternative embodiments, command instructions encoded in bar codes and/or keystrokes (e.g., soft keys, below) are included in data packets. The command instructions are interpretable by the application running in the host server as instructions to (i) switch from data reception to voice communications; and, then (ii) send a voice informational message to the user device; or alternatively, receive and record a voice communication from the user device (i.e., in response to the command instruction). The method of the invention allows switching from voice to modem (in response to a "switch signal") and then switching back to voice (in response to a data packet command instruction.)

The user device initiates all data transfers and "commands" a host server. The host is a "server" and only transmits in response to commands from the user device. The methods of the invention allow a handheld low power user device to conserve power by reducing (or cutting) current to the modem when no responses from the host server are pending. Thus, the user device is able to keep the modem in a low power "sleep" mode most of the time. This is very important because the modem can draw a significant amount of the power available for all circuits.

In other embodiments, the subject method for managing telecommunications includes methods for insuring the security of communications on the channel by using encryption and several different types of security and authorization verification methods. The subject methods find a variety of uses including many different uses in advertising and sales, e.g., in remote product ordering. The subject methods do not require that a user (i) have computer skills; or, (ii) learn new user software; or, (iii) have access to a PC, (or other relatively bulky, expensive presentation equipment, that is inconvenient to carry and use); or, (iv) know how to type; or, (v) speak English; or, (vi) know how to read a written language. The subject methods accomplish interactive multimedia real-time presentation of audio and visual informational to a user, e.g. a customer.

As disclosed herein, the present invention also provides methods by which sound, display messages and telecommunication signals may be accessed using codes embedded in a printed media; and, in a manner using a command structure transparent to a user, e.g., by using bar codes to direct command messages to a host server. The instant methods provide a user device having a bar code reader capable of sensing and scanning bar codes that is physically coupled to access to a telecommunication channel. The subject telecommunication channel allows the user device to transmit bar code initiated command messages to a host server. According to the present methods, the host server responds to the transmitted command messages by, in-turn, transmitting informational communication signals encoding multimedia informational messages to the user device, as disclosed above.

In other embodiments, the invention provides methods for voice and data communications between a user device and a host server using a protocol for encoding telecommunication data packets that is both "circuitry" and "protocol". "Circuitry", meaning that the hardware in the host server and the hardware in the user device are both capable of rapidly recognizing coded signals embedded in command message data packets and capable of responding by switching between different forms of bi-directional voice or data telecommunications in a manner that is transparent to a user. "Protocol", meaning that the subject method allows the particular hardware operational within the user device at any one point in time to be determined according to need (i.e., audio system, visual display, or bar code reader), and thus, power is only drawn when it is needed. The subject methods assist in enabling a user device that is small, low power and low cost while appearing to have the computational power of the host server.

In yet other embodiments, methods are provided for a handheld low power user device to control voice or data transmission and reception by a host server by transmitting to the host server a coded DTMF (and/or MF) "switch signal" that commands switching between data and voice. Switch signals are preferably transmitted immediately before a telecommunication data packet, in this case. Receipt of the "switch signal" at the host server instructs a switching of telecommunications signal types, i.e., between voice and data. The subject switch signals are capable of switching between forms of communication in less than about 1 seconds, preferably less than about 0.5 seconds, and most preferably less than about 0.1 seconds. DTMF and MF signals have the advantage that they are distinguishable from voice signals. Each DTMF (or MF) signal is composed of two frequencies that are not harmonic with each other. These non-harmonic tone pairs do not appear in speech or music. Thus, electronic circuits can detect DTMF (or MF) "switch signal" codes even in the presence of voice or music messages on the line.

Modem communications use FSK, DPSK, QAM and other signaling protocols to encode data. However, the tones used in these data encoding systems also may appear in voice and music. Thus, electronic circuits cannot readily distinguish between modem tones and voice or music messages and modems cannot reliably transmit or receive data when voice or music are on the same communication channel.

"Switch signal" codes according to the power conservation methods of the invention, are important since the host server (and user device) must turn off the modem when voice is being transmitted or the modem would create streams of invalid data commonly referred to as "modem chatter". Similarly, the user device cannot send modem data to the host computer server if the server is transmitting audio information messages on the telecommunication channel. The methods of the invention allow the user device to turn-off audio transmission from the host server, even while they are being transmitted on the communication channel. "Switch signal" codes are capable of interrupting ongoing voice communications and triggering a change in communications from voice to data. In addition, power conservation according to the invention needs methods for the user device to control the course of communications. By directing communications only the necessary hardware functions are enabled, i.e., either voice/audio or modem. It was considered unacceptable for a user to have to wait for long periods of time for a voice message to finish before a bar code could be entered as a next command. Verifications and acknowledgments from the host server to the user device (during interchange) are displayed on a display screen in the handheld unit. When modem transfers are complete the host server preferably defaults to audio and transmits a voice or sound (e.g., 'five products ordered') message.

In a representative example of a "switch signal", a user device transmits a DTMF (or MF) tone followed closely (supra) by a modem communication signal, i.e., containing a data packet. The host server CPU has an application running that is programmed to receive and translate the DTMF (or MF) "switch signal" code as a command instruction executable as all of the following: namely, (1) switch voice communications "off"; (2) switch modem communications "on"; (3) select communication parameters (e.g., set baud to 1200, set parity to Even); and, (4) receive modem telecommunications signals. In the latter case, time intensive handshake modem negotiations that can take 10 seconds or more are reduced to a single step of about 0.15 seconds which means that the power consuming modem in the user device is on for less time.

Skilled artisans will of course recognize that tonal pairs other than DTMF or MF may be used as "switch signals" according to the methods of the invention, provided that the tonal pairs are not harmonic with each other, and that they are not commonly encountered in voice or music.

Embodiments of the invention provide simple, fast, inexpensive and user transparent techniques for accessing detailed sound and visual messages by using printed bar code command messages to signal instructions for a server to initiate complex telecommunications providing "informational messages" to the user. In a preferred embodiment, printed media includes bar codes that, (using the methods of the invention), enable a user device to access information (over ordinary telephone lines or wireless channels) that is designed to enhance the content and quality of the print media by providing audio/visual support. Some representative examples of informational messages, accessible according to the methods of the invention, are as follows: namely, Print advertisements are enhanced by sound, including testimonials for the advertised product, dialogue for actors promoting the product, music and/or songs;

Print advertisements for entertainment products, such as movie or theater tickets, are enhanced by dialogue, theme music, or songs from the advertised show;

Printed "personal" advertisements are enhanced by spoken messages from the person placing the advertisement; and/or News articles and publicity are enhanced by extracts from an interview of the featured person.

The present methods also provide simple telecommunication methods for using a lightweight handheld portable user device to rapidly, simply (i.e., no user software to learn), securely and accurately direct command messages to a host server instructing the server to perform pre-programmed tasks. Some representative examples of pre-programmed tasks are as follows: namely, Price tags, product labels or product catalogs are enhanced by a bar coded command message to initiate an order session to facilitate rapid ordering of a selected product, particularly if the selected product has been ordered previously by the user, e.g. stockroom supplies. According to the present methods, the user device is operated to read and transmit bar coded product label information to a host server in a command message that also contains keystroke data to indicate the number of items ordered; and, Product labels or product catalogs are enhanced by a bar coded command to initiate pre-programmed clerical tasks, e.g., tasks routinely conducted by a customer or supplier in ordering and/or inventory control; tracking rate of product usage and calculating a time interval for reordering a product; accounting; invoicing; and the like. Representative pre-programmed clerical tasks performed by a customer according to the method of the invention include, but are not limited to: (1) logging the use of the product and its removal from a supply, (2) counting and recording the number of units remaining, (3) selecting and reordering a product, (4) completing a purchase order request, and (5) notifying accounting that an order has been placed.

Representative pre-programmed supplier clerical tasks performed according to the method of the invention include, but are not limited to: (1) checking availability of an item, (2) updating inventory records, (3) reordering items from suppliers, (4) invoicing the user and charging payment against an account or credit card, and (5) scheduling delivery to the customer's home or business.

Methods according to the invention also include those in which a user device is employed to read bar codes and bar-encoded command instructions in a product catalog, on the product, or posted in a stockroom, to facilitate ordering of a product.

In a preferred embodiment, the present system provides an account, and the account holder is provided (as disclosed herein, below) with security methods capable of limiting access, and/or restricting purchases initiated from the user device by amount and/or by product category. Some examples of security methods include, but are not limited to: (1) limiting access and/or purchases on a time basis, e.g., to business hours only; (2) restricting purchases initiated from a user device by product category, e.g. to selected types of paper products, hardware, and the like common to the particular inventory; (3) restricting access to require a password or other confirmation, (e.g. a pre-selected bar code password for certain classes of products so that employee's—or children's—access is restricted); or (4) limiting the cost of goods that may be ordered from a particular user device.

In other embodiments the present system provides methods for using a handheld user device to couple bar coded information in a printed media to a host server having dynamic (i.e., changing) product information. Representative examples of dynamic product information include, but are not limited to, information that becomes available only after the print media has been printed and distributed. Some examples of dynamic product information that may be accessed according to the invention are as follows: namely, Airline ticket information accessed using a bar coded command message to instruct a host server to supply the most current aircraft status information, including arrival, departure and gate information, over-booking, and alternative departure information;

Bank statements and credit cards accessed by using a bar coded command to instruct a host server to transmit an audio and/or visual message for displaying at the user device the current balance. Displaying user sensitive account information is more secure than voice because it cannot be overheard. Transmission of the information from the host server to the user device occurs over ordinary telephone lines, or cordless or wireless telephone links, with use of error correcting protocols and an encryption protocol; and, Stock or commodity prices are accessed by using different printed bar coded identifier for each different stock or commodity.

The subject methods of the invention also include those by which a handheld low power device having a high speed modem transmits encrypted voice messages to a host server over a telecommunication path, e.g., ordinary telephone lines or a wireless channel.

Embodiments of the invention also provide methods for using a low power handheld user device containing iprotected memory to perform financial transactions, i.e. as a "smart card" (as defined below). The bidirectional, error-free, secure telecommunication methods of the invention may be used to establish a telecommunications session between a financial institution, a vendor having a host server, and a handheld low power user device. It is also possible to initiate a session directly between a financial institution and the instant user device according to the embodiments of the invention. During the latter financial session, the operator of the user device may place an order (according to the methods of the invention) with the vendor, the host server may signal the financial institution that the smart card feature of the user device has been debited, and the host server may verify the purchase to the operator of the user device. According to a first preferred embodiment the subject handheld user device performs the functions of a "smart card" by connecting with a host server, and the host server in-turn connects with a financial institution maintaining responsibility for the funds in a user account. The methods of the invention offer a variety of levels of security during the latter session: namely, restricting access to the user device by identification and authorization; bar coding command messages to the host server; modem encoding and error-free transmission; and encrypting data being transferred between the user device and the host server. According to a second preferred embodiment, the user device connects directly with a financial institution maintaining responsibility for account funds using the smart card functions of the user device.

The following terms, as used herein, are intended to have meaning as follows: namely, "Handheld low power user device" is intended to mean a unit that can be comfortably held at arm length in one hand; capable of establishing communications along a telecommunication path with a host server; capable of transmitting to the server both voice and modem data, wherein the modem data contains representations of bar codes and keystrokes; capable of commanding the host server to supply voice and data information along the telecommunication path to the user device; capable of presenting to the operator of the device both audio and visual information received from the host server; and, capable of drawing power for all functions from a telephone line current or a wireless telephone battery. Preferably the user device draws less than 300 mw of power (e.g., for telephone line power connections) and most preferably less than 150 mw (e.g., for PBX or wireless battery power); includes a microprocessor having less 128 bytes of PROM, 4K bytes of protected memory and 8K bytes of RAM; weighs less than about 1 pound; and does not include a hard drive, a floppy drive or user software.

"Bar code reader" is intended to mean a device for sensing and reading a bar code, and in response thereto, for generating a digital or analog coded signal representative of those bar codes. Representative coded signals include UPC, AIM, ISO, ANSI, CEN, EAN, ISBT and other related or similarly operative standard codes for identifying products or services.

"Reading", used in regard to the subject methods of the invention, for operating a bar code reader in a user device, is intended to mean the processes of either moving the reader across the subject vertical bar code lines, or alternatively, 'point-and-shoot' operations in which the entire bar code is read at one time. "Reading" is further intended, (in its context of intended use herein), to include the steps of capturing reflected light from the bar code, processing the light information to determine bar width and spacing, and generating an analog or digital signal equivalent for the bar code that is transmissible to, and interpretable by, a microprocessor housed within the user device.

"User device" is intended to mean a multimedia device capable of transmitting data packets (optionally encrypted) and voice communications to a host server including all of the following: namely, bar code signals; communications and keystroke encoded signals; and "command message" signals (as disclosed further below). Further, the present "user device" is capable of receiving and displaying "information messages" received from the host server having a content that may include one or more of the following: namely, audio; visual; and data signals.

In referring to directionality of telecommunication according to the embodiments of the invention, a "command message" is intended to mean a telecommunication signal encoded by a microprocessor within a handheld user device that is transmissible to a host server and is capable of instructing the host server initiate the transmission of an "informational message" back to the user device. A command message is made up of instructional command data including one or more of the following, namely, bar code data, keystroke data, and/or a voice message. Representative elements of the user device capable of inputting instructional command data to the subject microprocessor, include a keypad, a microphone, and a bar code reader. "Informational messages" is intended to mean a telecommunication signal encoded at the subject host server and transmissible to a handheld low power user device. Representative command messages from the user device include requests, queries and demands for: lists of available inventory, accounting information, authentication of user ID codes, description of commercial products or service, description of product availability or projected delivery dates, display of order information (e.g. as a FAX message, below), presentation of audio sound messages including e.g., music, nature sounds, product endorsements, and the like, (as disclosed further herein, below).

"Informational message" is intended to mean a telecommunication signal or voice/audio message transmissible from a host server and capable of being displayed and or presented at a handheld "user device", (as disclosed further below). Representative elements of the user device involved in said "display" and "presentation" include (but are not limited to) a display screen (e.g., an alphanumeric or graphics display), capable of presenting text and/or numeric, graphic or pictorial information; and, an audio speaker capable of presenting audio information to the user, comprising e.g. words, tones, music, sound effects, and the like. In optional embodiments the "informational message" may be capable of displaying textual or numeric information to a user in one or more spoken languages. In other optional embodiments the "informational message" may contain data that may be private, confidential or otherwise privileged (e.g., bank records, credit information and business reports), and the display at the user device may be restricted to the display screen.

"Telecommunication" is intended to mean any process that enables one or more users (i.e., persons, or user devices and host servers) to exchange command messages and informational messages over a telecommunications path as digital or analog telecommunication signals decodable into data of any nature and deliverable over any usable medium, e.g., over wire, through air as radiowaves or microwaves (e.g., to satellite), through optical cable as optical signals, or through other media by other means, e.g., electrical or electromagnetic transfer through semi-conductor medium.

"Telecommunication signal" is intended to mean a signal transmissible according to a telecommunication process. Representative telecommunication signals include DTMF (as defined below), MF ("multiple frequency") tones, modem communication signals, multiplexed analog or digital voice communication signals, and the like.

"Data packet" is intended to mean a set of digital telecommunication signals having a beginning in time and an end at a later time, and being transmitted as a continuous unit encoded according to a format pre-determined between the user device and the host computer server and containing multiple bytes of data being transmitted over a telecommunication path. Representative data packets are disclosed below and contain modem communication signals that may include one or more of the following: namely, encoded keystroke data, encoded bar code data, and voice encoded as an analog or digital telecommunication signal.

"Wireless" is intended to mean a telephone connected with a Cellular telephone system using cellular telephone techniques or cordless or radio telephone techniques, including those systems using cordless transceivers, macrocells, microcells, and satellites.

"DTMF", is used herein as an acronym for dual-tone multiple frequency (i.e., "touch tone") communication signals, i.e., the generic name for the tone signaling format used to signal from telephones to switching equipment and involving 10-integer digits and two auxiliary characters represented by simultaneously sending two frequencies.

One frequency is selected from among a low frequency group of 697 Hz, 770 Hz, 852 Hz, and 941 Hz. And, the second frequency is selected from among a high frequency group of 1209 Hz, 1336 Hz, and 1447 Hz. When used according to the methods of the invention in a command message, the subject DTMF signals are selected from a combination of DTMF frequency groups used in public telephone networks. The use of four other DTMF tones that are commonly used to control public telephone networks are preferably to be avoided: namely, DTMF signals "A", "B", "C" and "D". Although these signals are allowable in the United States, their use in other countries is prohibited by regulations. (Many cellular telephones are not equipped to generate the latter "A–D" signals.)

"DTMF" frequency groups used in public telephone networks are as follows: namely, for "1", 1200 Hz and 697 Hz; for "2" or "ABC", 1336 Hz and 697 Hz; for "3" and "DEF", 1477 Hz and 697 Hz; for "4" and "GHI", 1200 Hz and 770 Hz; for "5" and "JKL", 1336 Hz and 770 Hz; for "6" and "MNO", 1477 Hz and 770 Hz; for "7" and "PRS" 1200 Hz and 852 Hz; for "8" and "TUV", 1336 Hz and 852 Hz; for "9" and "WXY", 1477 Hz and 852 Hz; for "*", 1200 Hz and 941 Hz; for "0" and "Operator", 1336 Hz and 941 Hz; and, for "#", 1477 Hz and 941 Hz.

The "CPT" (Call in Process Tones) are "used in telephone networks to indicate line status, and are as follow: namely, for a "busy signal", 480 Hz and 620 Hz at a cycle of 0.5 seconds on and 0.5 seconds off; for a "call progress signal", 440 Hz and 480 Hz; for a "ringing signal" 20 Hz; for a "dial tone" 350 Hz and 440 Hz. User interfaces with telecommunication signaling systems are subjects in *"General Recommendations on Telephone Switching and Signaling"* (International Consultative Committee for Telegraph and Telephone; CCITT) and *"K-Series Modem Design Manual"* (Silicon Systems Inc., 14351 Myford Road, Tustin, Calif. 92680).

"MF", is used herein as an acronym for "multiple frequencies".

"Transceiver" is used herein interchangeably with "communications transceiver" and "wireless transceiver" and is intended to mean all the user device hardware necessary to transmit to, and receive analog and/or digital telecommunication signals from, the host server. A representative transceiver includes (but is not limited to) a modem (below); a voice processing and transmissions element; a DTMF and/or an MF tone generator; connecting circuits from those units to the microprocessor; and, connections from those units to a telecommunication path. (If voice is transmitted in modem communication packets a codec device is also included to convert modem signals to analog voice.)

"Codec device" is used herein as a contraction of coder/decoder to refer to a telecommunications device capable of encoding analog voice into digital signals for digital signal transmission in a telecommunication network to a host server; and for decoding digital signals received from that host server back to analog voice. Representative examples of codec applications are digital cellular telephones or digital cordless phones (i.e., "wireless", above). Certain of the latter digital wireless phones have radio modems that transmit and receive radio frequency signals which are interpreted as digital data. Thus, codec devices may be useful for encoding and decoding voice messages that are to be sent and received by wireless radio modems.

"Modem" is intended to mean a device capable of both: (i) encoding for transmission on the communication medium signals received from a computer CPU or microprocessor; and (ii) decoding from a communication medium signals for the computer CPU or microprocessor.

"Microprocessor" as used herein with regard to user device is intended to mean a computer microprocessor chip (or chips) preferably having less than about 128 K-bytes but equal to or more than 12 K-bytes of PROM; and, having less than about 8 K-bytes of RAM, preferably less than I K-bytes, and most preferably about 512 bytes to about RAM.

"Bar code microprocessor", where so identified, is intended to mean hardware (distinct from microprocessor 122), that is directly coupled by circuitry to the bar code reader and functionally performs the task of determining the integers/numbers encoded on the bar code for transmission to microprocessor 122.

"Code" is intended to mean a set of unambiguous rules specifying the way in which digital (binary) characters are presented.

"Encode" is intended to mean the process of converting bits of digital information into tones suitable for transmission as telecommunication signals on a telecommunication path.

"Multimedia presentation" is intended to mean that the host server may be accessed using the user device and method of the invention; that it may be instructed/commanded to supply telecommunication signals comprising an. "informational message" to the user device; and, that the signal received by the user device is capable of audio and/or visual presentation at the user device. Representative elements within the user device capable of presenting audio and/or visual information to a user include a display screen (e.g., an alphanumeric display) a mixer and amplifier and coupled to a speaker. In an alternative embodiment, a multimedia presentation includes a facsimile document transmitted from the host server to a FAX machine at the location of the user device.

"Real Time" when used in the context of describing the process according to the invention, is intended to mean that the subject process takes place while the user is in telecommunication with the host computer server, i.e., the subject process may involve pre-programmed information but the audio or textual output to a user device is changeable and is generated dynamically. Representative examples of "real time" processes include sending display or voice responses to the user device in response to command messages from the user device; all occurring while an operator waits for the display or voice response. In a preferred embodiment the response time is short and the operator does not notice the waiting time. A first representative example of a "real time" operation is provided by the steps of: (1) an operator pushes a button on the keypad of the handheld low power user device; and, (2) in response, the operator receives a voice or screen display from the host server in less than about 1 to 2 seconds. If the response time is less than about 1 to about 2 seconds the user will tend to ignore the delay. A second representative example of a "real time" operation is provided by the steps of: (1) an operator directs the bar code reader in the handheld low power user device to scan a bar code; and, (2) the operator hears a voice response in less than about 1–2 seconds, i.e., while the operator waits.

"Soft key" is intended to mean a keypad key in a subject user device that may be assigned a function by an application running in the host server, e.g., "send more product information", or "cancel that last item from the order". The functionality of a "soft key" can be changed at the host server allowing upgrades and changes without modification of the user device. The "ON/OFF" key of the user device is also a soft key, but in a different way. Namely, the "ON/OFF" key has a fixed function of turning the handheld user device on and off, but also a "soft key" function in that the key may also be associated with a programmable access telephone number (i.e., in the user device PROM) for contacting a host server.

"Smart card" is intended to mean a credit/debit card having one or more programmable computer chips with volatile memory embedded therein. User information encoded therein may contain account numbers, balances, ID codes or other information useful to facilitate a financial transaction. A "smart card" may be used to make purchases and be updated at a point of sale (POS) terminal. "Smart cards" can be used like cash. A user deposits money in a financial institution and the smart card is updated accordingly. As a user makes purchases, the balance in memory of the smart card is updated, both electronically and in real time. If a smart card is lost or stolen, the financial institution is notified and it will no longer validate withdrawals from the card. Smart cards can also provide medical information.

"Operator" is intended to mean a human controlling a handheld low power user device according to the methods of the invention.

In the following paragraphs, the telecommunication methods of the invention will first be disclosed, followed by details of the electronics of the low power handheld user device.

The component numbering system (identified in bold type) that is used throughout the accompanying disclosure is as follows: namely, the first integer refers to the FIGURE number; the second and third integers refer to the component part number. For example, number 120 makes reference to a user device, that is part number 20 in FIG. 1.

Methods for Coupling the Present User Device to a Host Computer Server

Figure 1B:
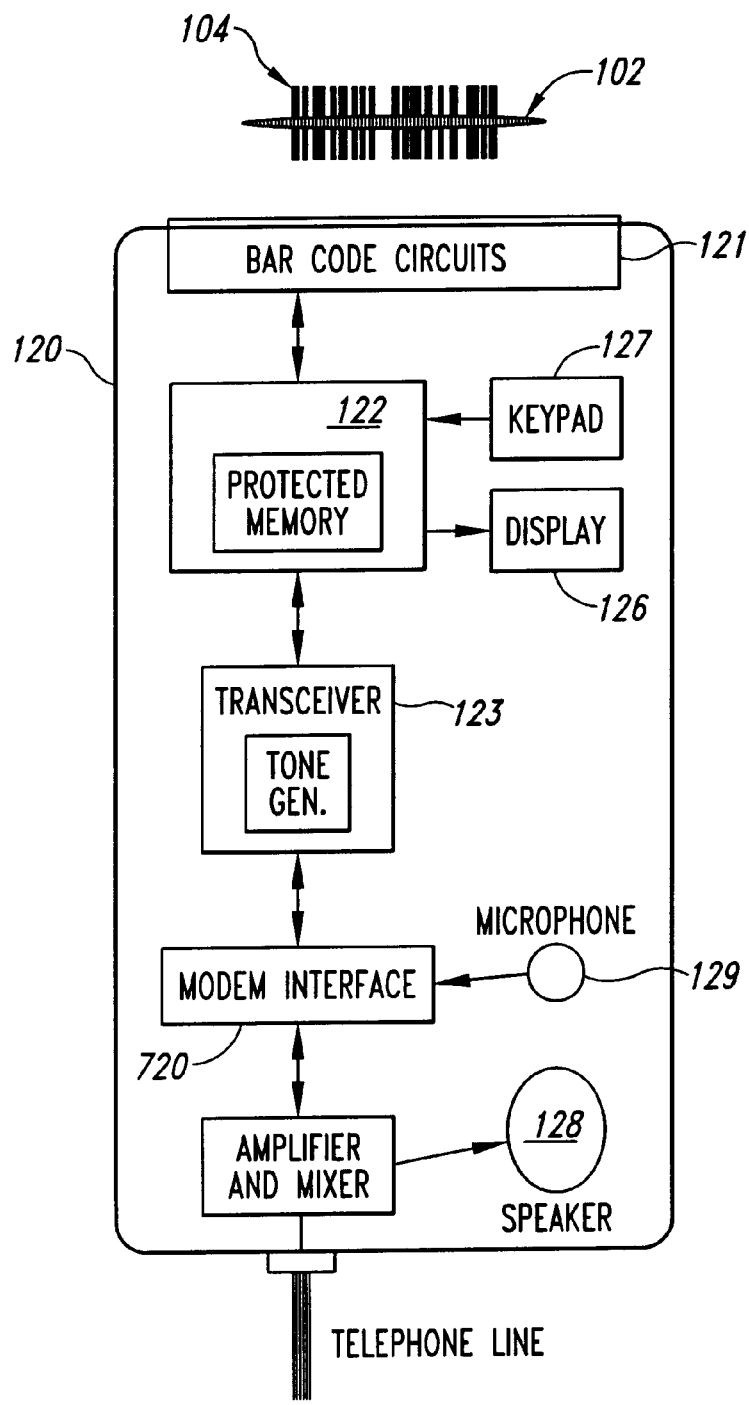
FIG. 1B depicts a block diagram of a user device containing a CCD-type bar code reader, (below).

FIG. 1 depicts a block diagram of a user device reader illustrative of a telecommunication system of the invention.

An illustrative system 100 for communicating with a host server 110 includes a user device 120 capable of reading bar codes, generating a telecommunication-signals and conveying voice communications, and transmitting the signal to a host computer server (as defined above). The user device 120 includes a bar code reader 121, a local microprocessor 122, mixer 141 for coupling bi-directional voice and data telecommunication signals to a communication transceiver 123 along a telecommunications path 131, and hardware elements for presenting both visual and sound information to an operator.

Those skilled in the art will recognize that LED bar code readers may be replaced with certain other alternative signal generating input means including for example CCD bar code readers or electromagnetic detectors and the like, providing that making such a replacement, or addition, would not require invention or undue experimentation, and would therefor be considered to fall within the scope and spirit of the present invention. In representative alternative embodiments, the input signal devices may include one or more of the following: namely, scanners for magnetic bar codes, two-dimensional "bar" code readers, scanners for mark/scan codes, optical character recognition elements, CCD scanners, laser scanners, handwritten character recognition elements, and the like.

The bar code reader 121 includes a reading device for sensing and reading bar codes (e.g., a "point-and-shoot" CCD wide angle scanner or single integer scanner;

where thousands of optical sensors record the image of a bar code at once, (i.e., taking a 'snap shot' of the bar code image), or a moving single point sensor scanner that records the image of the bar code over time (as disclosed further below). The single point scan is designed to detect the proximity of a bar code media, thereafter, the power consuming circuits of the bar code reader are enabled and a reading is taken. The CCD bar code scanner like wise has a means for detecting the proximity of a bar code media, including one or more light sources and detection circuits. The CCD bar code scanner contains an optional bar code microprocessor with a timer. The latter bar code microprocessor enables a very low power mode in which it keeps watch for a bar code media (as disclosed further below), and in which the thousands of CCD scanner lights are only supplied with power when there is proximity to a bar code media. Signals from either the CCD scanner or the single point sensor are processed by microprocessor 122.

While bar code readers and bar code signals may be known in the art, low power bar code readers drawing their current only from a telephone line source (e.g., less than about 300 mw) and having circuits to reduce power requirements by timing and signaling to trigger "sleep" and "proximity-awake" modes are not believed to be known in the art at present. "Sleep" and "proximity awake" low power bar code reader circuits, (as well as other power conservation methods disclosed below), allow power usage to be managed so that the current available in a telephone line (or wireless telephone) is sufficient to run the bi-directional voice and data modem, the display and the audio amplifier circuits of the user device. Similar capabilities in a handheld user device are not believed to be known in the art.

User device 120 may include a separate bar code microprocessor, i.e., distinct from microprocessor 122, e.g. to reduce the work load on microprocessor 122. The bar code microprocessor may perform "wake up" functions (disclosed further below), bar code decoding functions, and/or timing signal functions involved in activating the different lights in a bar code reader, e.g., in a CCD light source.

Digital signals representative of a bar code are transmitted to microprocessor 122 (located within the user device 120).

Microprocessor 122 receives the digital bar code signals and converts them to ASCII (or other) codes which uniquely identify a bar code digit or character. Microprocessor 122 prepares (and optionally encrypts) command message data packets for transmission to host server 110. A representative data packet (according to the subject methods) includes one or more of the following: namely, encoded bar code signals, data identifying keystrokes, data identifying information about the user device 120, authentication information, and/or a media integrity code (such as a checksum or CRC). In a preferred embodiment, the local microprocessor 122 in user device 120 encodes the command message and associates the message with a media integrity code prior to transmission to host server 110.

The local microprocessor 122 includes memory for programs and data, and a protected memory 128 for storing program information essential to the operation of the system methods of the invention. The subject memory also includes at least user identification and account information. In a preferred embodiment, protected memory 128 is secured and the contents thereof may not be compromised if the user device 120 is lost or stolen. In a most preferred embodiment, protected memory 128 includes a memory that will self-erase if it is forcibly opened mechanically or electronically, so that the subject memory cannot be accessed except during the course of ordinary operation of user device 120. Electronic hardware and secure firmware capable of providing protected memory are known in the art of semiconductor manufacture. In the presently most preferred embodiment, information private to the user, such as account numbers, account passwords, and credit card numbers and the like, are encrypted for transmission and are stored in an encrypted state in a protected or an ordinary temporary data memory location while the parameters necessary for decrypting the stored information are recorded only in the protected memory 128.

A command message generated by microprocessor 122 is coupled to communication transceiver 123 (as defined above). In one embodiment, communication transceiver 123 converts digital information from microprocessor 122 to analog signals suitable for transmission on telecommunication path 130 to host server 110. In one presently most preferred embodiment, the command message transmission to the host server includes a DTMF, MF or multiple frequency tone signal followed by a sequence of modem communication signals that make up a data packet. (Transceiver 123 includes both a modem and a multiple frequency tone generator.)

Embodiments of the invention provide methods for using a handheld low power user device and methods for bi-directional (i.e., interactive) flow of data between a user device and a host server. The elements involved in presenting visual and/or sound informational messages to a user include communication transceiver 123, microprocessor 122, screen 126, audio mixer 111 and amplifier 112 coupled to speaker 128. The screen 126 is capable of presenting text, numeric, graphic, and/or pictorial information to the user. The speaker 128 is capable of presenting audio information to the user, including words, tones, music, sound effects, nature sounds, or other tones (e.g., horns, bells, whistles, etc.). In a presently preferred embodiment, speaker 128 is used to present text or numeric information to the user by speaking that information, i.e., in a voice language, but when the host server encodes an informational message containing data that is private, confidential, privileged or otherwise sensitive, an informational message is encoded for presentation only at display screen 126. In other applications where secure voice messages are required, the voice message may be digitized and then encrypted prior to transmission from a host server to a user device (or vice versa). The latter encrypted information message is decrypted at user device 120 (or server 110) and converted to an audio format using a codec or digital to analog converter.

Voice messages transmitted from the user device to the host server are commonly in an analog format. Mixer 141 normally amplifies the voice signal from microphone 129 and couples it to local access channel 131 to telecommunications path 130. In applications where voice security is desired, the voice signal from microphone 129 is converted to a digital signal and encrypted by microprocessor 122. The encrypted digital voice signal is then transmitted (through communications transceiver 123) to host server 110.

The elements that may be involved in generating a command message for transmission to the host server include keypad 127, microphone 129, bar code reader 117, microprocessor 122 and communication transceiver 123.

In a preferred embodiment, communication path 130 includes a local access channel 131 (e.g., telephone lines), to a telecommunication network 132 (e.g., a carrier) coupled to host server access channel 133 coupled to host server 110. Functions of communication transceiver 123 include: (i) encoding a DTMF signal (e.g., a telephone number) uniquely associated with access channel 133 to host server 110, (ii) making a "handshake" connection with host server 110, and (iii) transmitting the command message from microprocessor 122 to the host server 110 along telecommunication path 130.

In a preferred embodiment, local access channel 131 is a land-line telephone line and user device 120 and communication transceiver 123 are adapted for coupling thereto. In a first alternative embodiment, the local access channel 131 may include a wireless telephone line. The communication transceiver 123 is adapted for coupling thereto a using a cellular telephone connection 505. In a second alternative embodiment, the local access channel 131 may include a land-line telephone line and wireless transceivers 110 and 601. The communication transceiver 123 is adapted for coupling thereto using a cordless radio link to wireless transceiver 601.

Those skilled in the art will recognize, that telecommunication path 130 may include other means for communication, such as a local or wide-area computer networks, or satellite and microwave links, and that replacement of telephone links with such other telecommunication means is within the ordinary skill in the art and does not require invention or undue experimentation, and thus, such ordinary substitutions or additions will fall within the scope and spirit of the invention.

According to the methods of the invention, it will also be understood that when the subject user device is connected to a wireless telephone having a radio modem, then the need for a separate modem (i.e., in the user device) may be obviated. Further, the methods of the invention find use where a wireless telephone has a codec unit that is connected with a radio modem. In the latter case, the subject user device has a modem connected to the codec unit (which is in-turn connected to the radio modem in the cell phone).

By way of explanation, some cellular telephone manufacturers provide direct codec interfaces into telecommunication channels, while others provide interfaces through a radio modem. In either type of device, a key factor is the algorithm used to compress the particular radio modem data. Skilled artisans will recognize that certain compression algorithms designed for voice transmissions will distort modem signals.

Other compression algorithms designed to remove background noise (i.e., repetitive signals) can confuse modem signals with background noise and therefor remove a signal. Certain wireless telephones allow direct access to a radio modem, allowing access for the instant user device. In three representative, and presently preferred embodiments, wireless telephones manufactured by: Ericsson G. E. (Research Triangle Park, N.C.), provides a cellular telephone with a codec interface, i.e., an analog interface; Qualcomm, Inc. (San Diego, Calif.), provides wireless transceivers used for both analog and digital cordless telephones; and, Zilog Inc. (Campbell, Calif.), provides wireless transceivers (wireless modems) useful for both analog and digital cordless telephones, with the digital model providing a direct access to a wireless modem.

Thus, the disclosed methods of the invention are not intended to be limited to applications involving a single handheld low-power user device configured for only one particular telecommunications use. Wireless uses are presently most preferred, connecting a user device (according to the invention) directly to a wireless modem may provide data transmission speeds that are faster than with a conventional telephone-wired modem. The latter attribute is useful when sending large data packets, such as associated with graphic displays or modern encryption methods for data and voice. Direct access to a high speed modem also allows voice messages to be encrypted for greater privacy.

In a preferred embodiment, the host server 110 includes an order processing element 111 and a sound processing element 112. Elements 111 and 112 may be physically located within the same host server 110, or alternatively, they may be interconnected to one another via a local or wide-area network; or in yet another alternative, they may be interconnected via telecommunication channels. In one embodiment, the order processing element 111 and the sound processing element 112 are physically separate computing devices. In a representative example, one or more order processing elements 111 are physically located at an order processing center, while the sound processing elements 112 are physically located at several different product distribution sites. Most preferably, there is one sound processing element 112 for each telephone area code. In a second embodiment the order processing element 111 and sound processing elements 112 are located at a central site where access channels 133 may e.g., be "800" telephone numbers.

Text and audio informational messages may be recorded in a memory location in host server 110 at the order processing element 111; or alternatively, they may be stored in a memory location in sound processing element 112; or in yet another alternative, text and audio informational messages may be generated dynamically, e.g., using sound processing element 112.

In alternative embodiments, order processing element 111 may include a single computer processor unit (CPU) or several units e.g., coupled together into a local or wide-area telecommunication network. The order processing element 111 may also be coupled through telecommunication channels to other host servers, such as may be present at a credit card authentication center or a smart card financial institution. The order processing element 111 includes memory locations for inventory, user information, delivery schedules, accounting information and the like. Representative examples of assigned memory locations in order processing element 111 may include e.g. user profiles such as account numbers, user device numbers and authentication codes and language preference (e.g., Spanish, English or Russian and the like). Other examples of assigned memory locations may include e.g. prior ordering history; inventories of goods or services that can be ordered; delivery schedules; and invoice, billing and collection histories.

Sound processing element 112 in host server 110 includes communication transceiver unit 113 that receives command messages transmitted from user device 120 and capable of decoding them into a digital form acceptable to order processing element 111. The sound processing element 112 also receives DTMF, MF and/or multiple frequency signals. Upon receipt of one of the latter signals at host server 110, the application running in the CPU immediately turns off any sound output from sound processor 112. Sound processing element 112 also includes an audio and/or digital recorder, (e.g. an answering machine), capable of collecting voice messages from a user device for analysis (preferably in real time) by an order processing clerk. (Voice messages may include real time verification of an authorized user.) Sound processing element 112 also includes a speech synthesizer 114 capable of transmitting voice messages to user device 120 that are either amplified (i.e., for analog voice) or converted and amplified (i.e., for digital voice) before presentation to an operator of user device 120.

Informational messages for transmission on communication path 130 are coupled to transceiver 123 by audio amplifier and mixer 141. Transceiver 123 couples the informational messages containing data packets to microprocessor 122 which, in-turn, couples the messages to screen display 126. Transceiver 123 couples informational messages containing voice directly to amplifier mixer 141, which in-turn is coupled to speaker 128. Commonly, it will be desirable to "blank out" speaker 129 when transmitting (or when receiving data) and a variety of different common circuit designs may be useful for this purpose.

In one presently preferred embodiment, command message transmitted from a user device 120 to a host server 110 include one or more DTMF (or MF) tonal pairs for processing by sound processing element 112; followed by a modem communication signal for processing by transceiver 113. The latter modem communication signal may contain one or more command instructions to the host server 110, wherein receipt of a command instruction is interpreted by an application running at the host server 110 as specific instructions directable e.g. to a location in either the order processing element 111 or sound processing element 112. Representative examples of specific coded command instructions directable to the order processing element 111 are disclosed further, below. Representative examples of specific coded command instructions directable to the sound processing element 112 include instructions to access speech synthesizer 114 and generate and informational message to user device 120 that includes telecommunications signals generating synthetic speech for presentation as user device 120.

In one presently preferred embodiment, host server 110 opens a telecommunication channel 150 to a facsimile (FAX) machine 140 located at the operator's residence (or place of business) and transmits textual FAX informational messages to that machine. Representative FAX informational messages are disclosed further below, and include completed order verification forms, and the like. The secondary communication channel 150 is preferably in made up of a secondary local telephone line 151 coupled to telephone network 132 coupled to a secondary host computer telephone line 152 coupled to the host server 110. The secondary host computer telephone line 152 may include a separate telephone line or may be multiplexed with the host computer telephone line 133. In addition, informational messages produced at order processing element 111 may also contain a graphical informational message transmitted on a secondary communication path 150 to facsimile machine 140. In one presently preferred embodiment, the graphical message transmitted to the FAX machine 140 includes one or more user-selectable bar codes that are readable by user device 120 and capable of transmission back to the host server 110 in a manner such that the host server 110 interprets the subject transmission as containing one or more coded command instructions, (i.e., as disclosed above). For example, the subject graphic informational message may include a set of bar codes offering to the user the selection of: (a) approving a tentative order; (b) canceling a pending order; (c) editing a pending order; (d) requesting whether an item is available in inventory; (e) delivery status; or, (f) other price or accounting information related to a pending order. In another example, the graphical informational message may include a status report for the user account.

The Sound Processor Element

Figure 2:
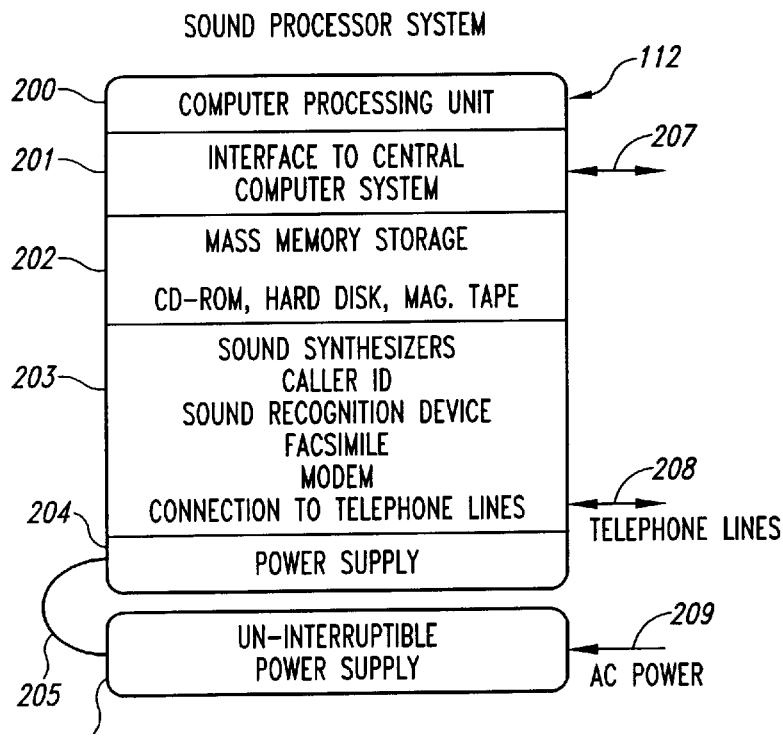
FIG. 2 depicts a block diagram of the sound processor element.

FIG. 2 depicts a block diagram for a sound processor element.

In a presently preferred embodiment, sound processor element 112 includes an IBM-compatible PC-type computer having a CPU 200, program and data memory, mass storage 202, and a power supply 204. The power supply 204 is coupled using a power cable 205 to an uninterruptible power supply 206 coupled to a power source 209. Those skilled in the art will recognize that sound processor element 112 may include another architecture for a computer, such as a UNIX-workstation, an Apple Macintosh, a mini-computer, a mainframe computer, or other such CPU.

Mass storage 202 preferably includes at least one hard drive, and may further include a CD-ROM or magnetic tape element. In a preferred embodiment, mass storage 202 stores informational data regarding user accounts, and also stores visual/audio informational messages, including digitized recorded sound.

The sound processor element 112 includes an interface element 201 for coupling to order processing element 111. The interface element 201 is coupled to a telecommunication link 207. The telecommunication link 207 may include a local or wide-area network, a satellite link, a telephone link, or another means for coupling to another processor.

In alternative embodiments, sound processor element 112 may include a set of devices 203 coupled to a telephone line 208, including a sound synthesizer 114, a "caller ID" element, a voice recognition element, a facsimile element, and one or more modem units. In one presently preferred embodiment, sound processor element 112 includes a D/41D™ 4-port voice synthesizer and digital voice recorder product, the voice recognition element includes the VR/40™ voice recognition or verification product, and the facsimile element includes the FAX/120™ 12-channel FAX output card product, all made by Dialogic, Inc., of Parsippany, N.J. The presently preferred "caller ID" element includes a Caller ID™ module, available from Rochelle, Inc., of Texas, and a first preferred modem is available under the Voice View™ product name licensed by Radish Communications Systems, Inc., of Boulder, Colo. The Voice View modem is preferably modified to accomplish the methods of the invention by writing a novel BIOS for the DSP of the modem. DSP chips compatible with the Voice View product are manufactured and sold as the "RSV288DPi™" and "RC144ACF-P™" products by Rockwell International of California who also provides development resources necessary for the novel BIOS. A second preferred modem is available as the "73K2224™" product from Silicon Systems of Tustin, Calif. The latter modem contains a communication protocol that is under program control and in this respect offers certain advantages.

The User Device

Figure 3:
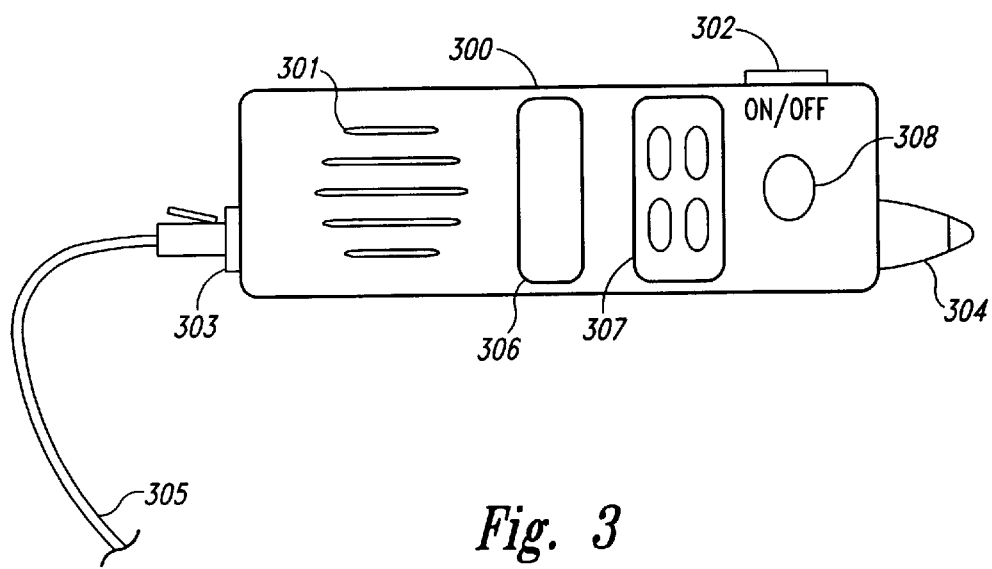
FIG. 3 depicts a diagram of a first user device.

FIG. 3 shows a diagram of a first user device.

In one preferred embodiment, the user device 120 is relatively small, preferably handheld. The user device 120 preferably includes a single integrated handheld module incorporating a bar code reader, a speaker, a microphone, a screen (e.g., an alphanumeric display), an on/off button a keypad, a microprocessor, audio mixer and amplifier, and transceiver (i.e., modem, voice processor, CPT recognition element, multiple frequency tone generator, and optional codec unit) all within a space of about 1 inch (about 2.54 cm) by 3 inches (about 7.62 cm) by 8 inches (about 20.32 cm); preferably having a weight of less than about 1 pound (454 gm); and most preferably drawing less than about 300 milliwatts (mw) average of power.

The user device 120 includes an enclosure 300, a speaker and speaker grill 301, an on/off button 302, a screen 306, a keypad 307, and a microphone 308. The bar code reader 121 is fastened to the enclosure 300 and has a bar code sensor 304 which protrudes from enclosure 300. In optional alternative embodiments, bar code sensor 304 may be of a CCD type (below) or a single point sensor type. Bar code sensor 304 may be illuminated using an light-emitting diode (LED), or in the case of a CCD type sensor, an array of LED's. Bar code sensor 304 may compile the reflected light signal by having the user move the single point sensor across the bar code, or alternatively, the sensor may be a "point-and-shoot" CCD-type scanner according to the disclosure, below.

Figure 17:
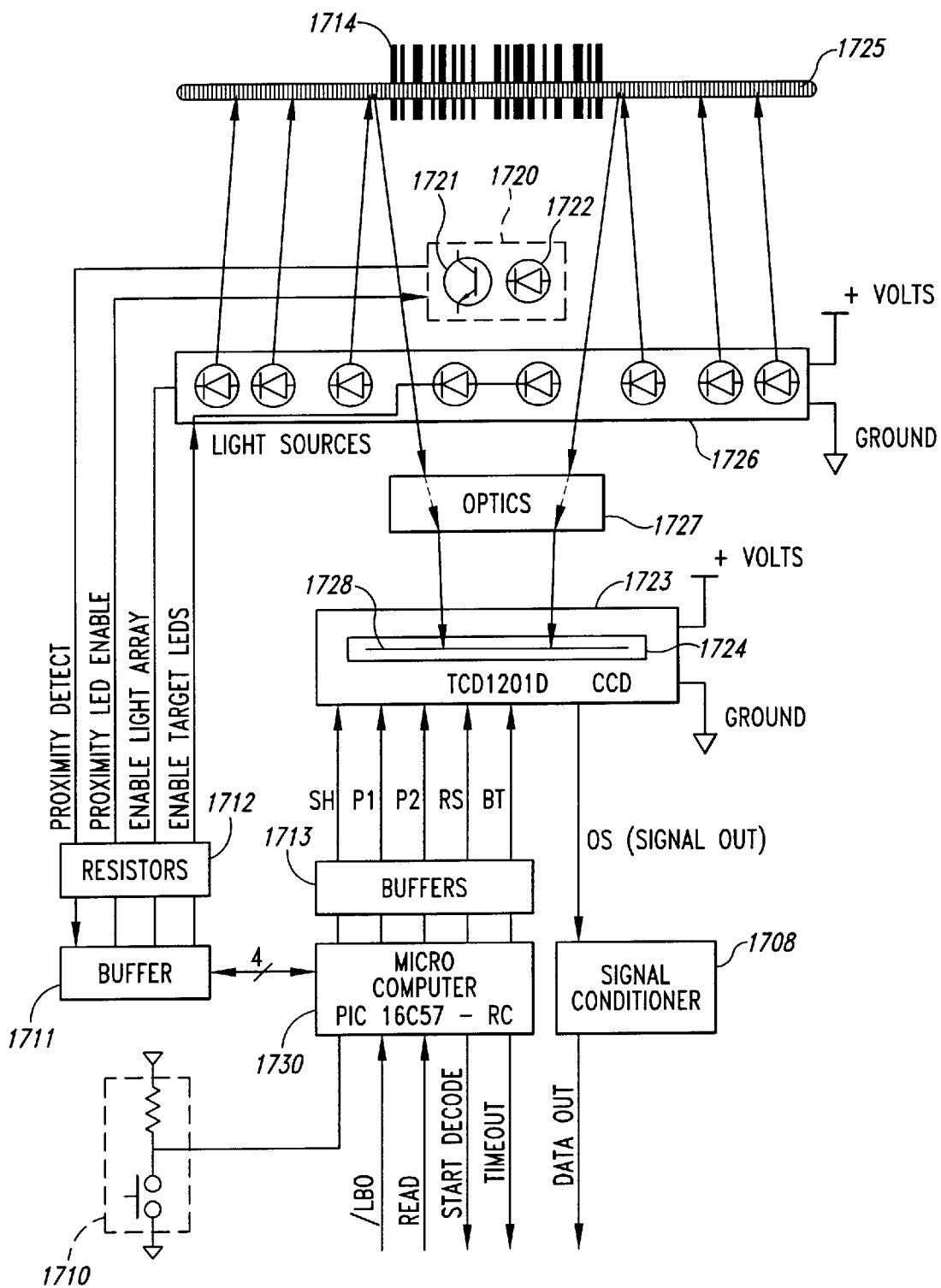
FIG. 17 depicts a CCD type bar code reader with a proximity detector (as disclosed below).

Most CCD scanners in the art unsuitable for use in the present methods of the invention because they are equipped to continuously flood a bar code with light until a reading is achieved. The latter method uses an amount of power that the subject user device 120 cannot supply. Recognizing the exorbitant amounts of power lost in just trying to obtain a valid reading, and that many such failures were related to reading at a distance too greater for obtaining a valid reading, the alternative method of the invention was developed. According to the instant method, a low current proximity detector 1720 (FIG. 17), drawing less than 10 ma of current, is employed to find the correct reading distance where a CCD reader will be able to obtain a reading. Proximity detector 1720 includes one or more target indicator lights 1721 and a photodetector 1722. Bar code reading according to the subject method is achieved by the following means: namely, light 1721 emits continuous (or strobed) directional light toward a bar code. If the bar code media is within a target range for photosensor 1724 in CCD chip 1723 then the reflected light from the bar code is detected as being within a focal axis 1725 and a "Proximity detect" signal is sent to bar code reader microprocessor 1730. Upon receipt of the subject signal microprocessor 1730 turns on CCD light source 1726 flooding the bar code with light and generating reflected light on focal axis 1725. CCD optics 1727 focus the reflected light into the window 1728 of CCD chip 1723. Bar code microprocessor 1730 uses clock signals SH, P1, P2, RS and BT to execute reading of the subject bar code by the CCD chip 1723. CCD chip 1723 outputs an analog "image" of the subject bar code on OS (signal out). The analog signal is converted to a digital signal by signal conditioner 1729. "Data out" from the signal conditioner is sent to bar code microprocessor 1730 for decoding. "Start decode" output from bar code microprocessor 1730 instructs user device microprocessor 122 to start decoding the bar code data signal and begin encoding the signal for transmission in a data packet. Artisans will recognize that in alternative embodiments the tasks accomplished by microprocessor 1730 may be intrusted to an appropriately modified microprocessor 122. Control for target signal light(s) 1721 is achieved through buffer circuit 1711, which is activated for reading by timer (e.g., for continuous or strobing etc.), and where power usage is under control of microprocessor 1730 and/or microprocessor 122. In a presently most preferred embodiment, bar code microprocessor 1730 has a low power "Sleep" mode and internal timer program to wake up the processor several times each second. After awakening, microprocessor 1730 turns on proximity detector 1720 and triggers target indicator light(s) 1721 to check for proximity of a bar code. If a bar code is detected, microprocessor 1720 wakes up microprocessor 122 and sends out "Time-out" and "Start Decode" signals. Microprocessor 122 processes the subject bar code signals from bar code microprocessor 1730 and, if it is incorrect, requests another reading by sending a "Read" input to microprocessor 1730. In one preferred embodiment, microprocessor 1730 has an interval timer circuit that draws less power than the interval timer in microprocessor 122, thereby conserving power by leaving microprocessor 122 to "sleep" until needed for telecommunications tasks.

In a preferred embodiment, keypad 307 includes a relatively small set of keys for entry, such as a set of numeric keys and a small set of special function keys. As the user device 120 is handheld, it is desirable that the keypad 307 also be relatively small.

Audio information is presented to the user through speaker and speaker grill 301. Visual information, preferably including private or sensitive information such as user account numbers, is presented to the user on a screen 306. The user enters command instructions and/or data, i.e., for encoding into a command message, using bar code reader 304, keypad 307, and/or microphone 308.

In one preferred embodiment, the user device 120 is coupled to telephone line 131 for both power and telecommunication signaling. User device 120 includes a telephone connector 303 for coupling to a cable 305 that is in-turn coupled to telephone line 131.

Figure 4:
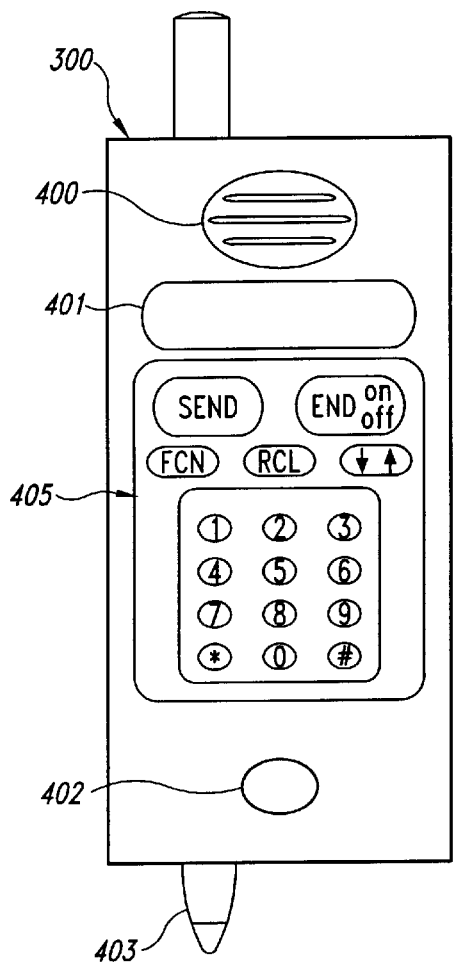
FIG. 4 depicts a diagram of a second user device.

FIG. 4 depicts diagramatically a second user device.

In an alternative preferred embodiment, user device 120 is coupled to a cellular telephone. The subject user device 120 includes a single integrated handheld module having an enclosure 300, a speaker and speaker grill 400, an optional bar code reader, a screen 401, a microphone 402, a keypad 405, an on/off button, a microprocessor, audio mixer and amplifier, and telecommunication transceiver elements (defined above). Bar code reader 121 is fastened to enclosure 300 and has a bar code sensor 404 protruding from the enclosure 300. The bar code sensor 404 may be illuminated using an light-emitting diode. In optional embodiments, bar code reader 404 (and 121, above) may be of a CCD type or a single point source type, above.

Audio information is preferably presented to an operator through the speaker and speaker grill 400. Visual information, preferably including private, confidential and/or sensitive information (e.g. account numbers), is presented to an operator on screen 401. The operator enters command instructions and data for encoding into command messages using bar code sensor 404, keypad 405, and/or microphone 402.

In the subject alternative preferred embodiment, user device 120 may be powered by the cellular telephone battery, and the user device 120 may optionally use the cellular telephone's microprocessor for some processing tasks, possibly e.g. including but not limited to decoding bar code signals from the bar code sensor 404.

Figure 5:
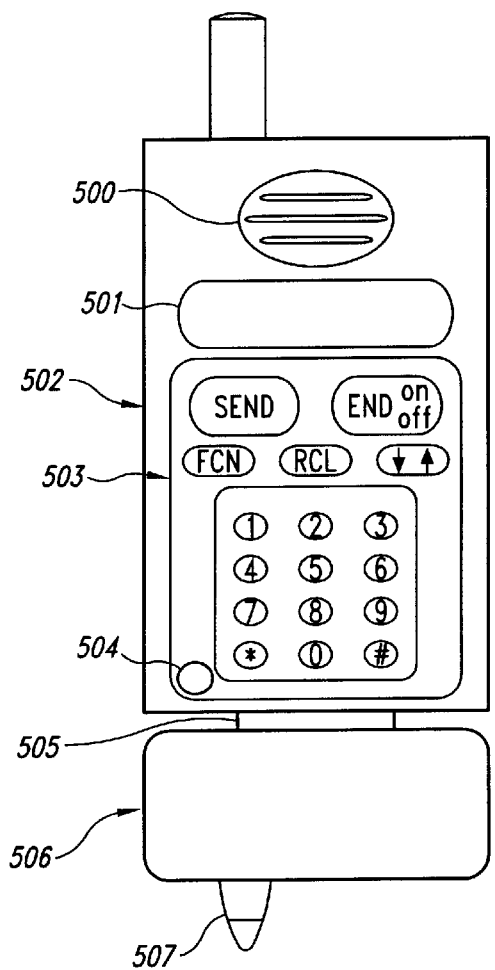
FIG. 5 depicts a diagram of a third user device.

FIG. 5 diagramatically depicts a third user device.

In a second alternative preferred embodiment, user device 120 is fastened to a cellular telephone, e.g. using an adapter enclosure 506 and an adapter interface 505 to couple the unit to the wireless telephone 502. The bar code reader 121 is fastened to enclosure 506 and has a bar code sensor 507 that protrudes from enclosure 506. Enclosure 506 also contains the microprocessor, an optional audio mixer and amplifier, and telecommunication transceiver elements (defined above) of the subject user device. Bar code sensor 507 may be illuminated using an light-emitting diode. In optional embodiments, the bar code sensor 507 may be of the CCD type or single point source type, above.

Other components necessary to the telecommunication functions of the user device 120 may be components that have shared use with cellular telephone 502, e.g., the cell phone speaker and speaker grill 500, its screen 501 and keypad 503, the cellular phone microphone 504 audio mixer and amplifier, and optionally its on/off button 508.

Audio information is presented to an operator through speaker and speaker grill 500. Visual information including private or sensitive, confidential or privileged information (e.g., user account numbers), is preferably presented to an operator on the screen 501. An operator may enter command instructions and data for encoding into a command message using bar code sensor 507, keypad 503, and/or microphone 504.

In the subject second alternative preferred embodiment, user device 120 also optionally employ's the cellular telephone's microprocessor for some processing tasks, e.g., sending and receiving voice telecommunication signals, DTMF or MF tones, and detecting call progress tones, or displaying messages on the cell phone's display.

In the latter alternative preferred embodiment, the user device 120 is preferably powered by the cellular telephone battery in like manner as described with regard to FIG. 4. A representative example of a cellular telephone 502 useful in the most preferred embodiments of the invention is the CT 700™ cellular telephone product made by Ericsson GE Mobile Communications, Inc., of Triangle Park, N.C.

In a preferred embodiment, the user device 120 is small relative to the size of the cellular telephone. The user device 120 preferably fits within a space 1 inch (about 2.54 cm) by 3 inches (about 7.62 cm) by 4 inches (about 10.16 cm) in size, preferably weighs less than about 1 pound (454 gm), and preferably draws less than about 300 milliwatts (mw) average of power, most preferably less than about 150 mw of average power and less than about 5 milliamps of average current.

Figure 6:
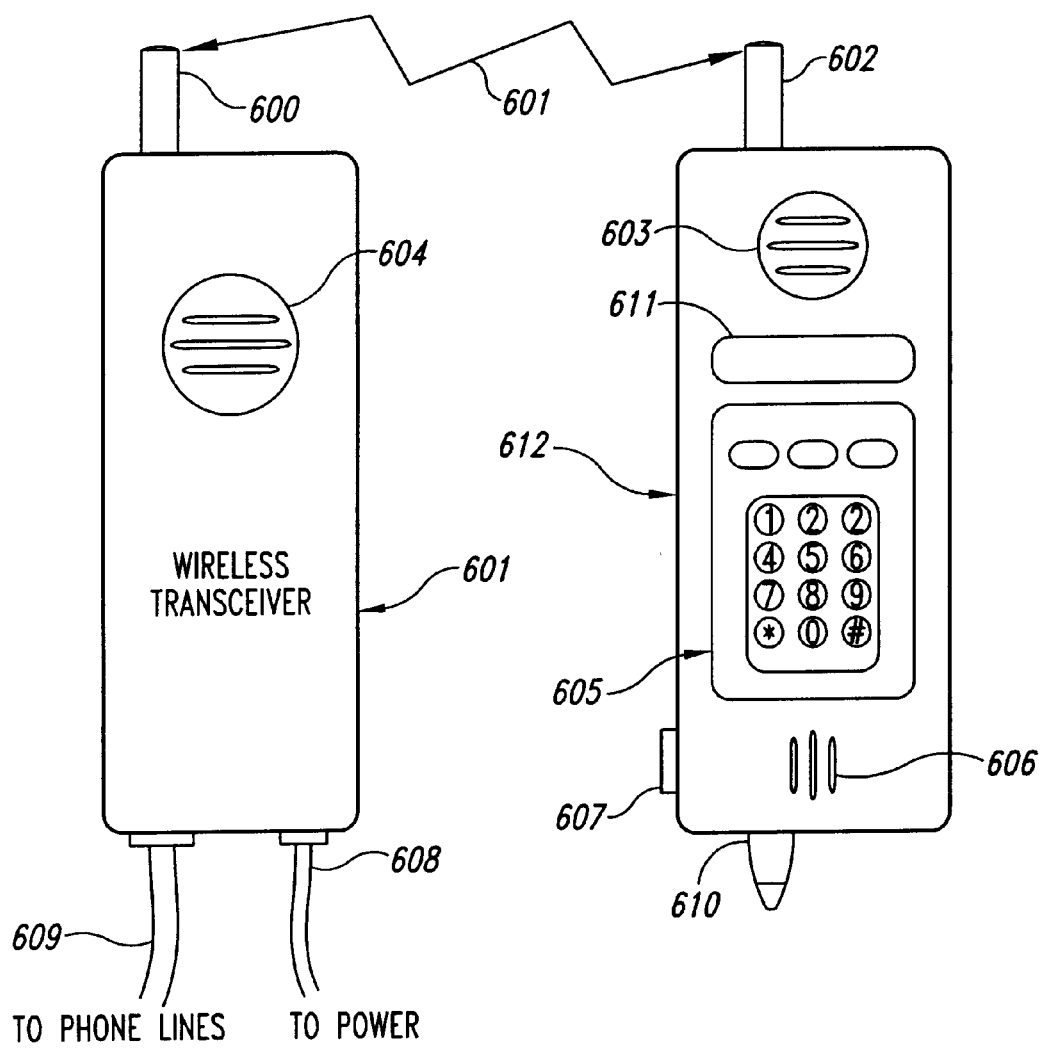
FIG. 6 depicts a diagram of a fourth user device.

FIG. 6 depicts diagramatically a fourth user device.

In the alternative preferred embodiment depicted in FIG. 6, user device 120 is coupled using a radio link to a wireless transceiver 601 such as may be used for cordless telephones, user device 120 includes an enclosure 612, an antenna 602, a speaker and speaker grill 603, a keypad 605, a microphone 606, a screen 611, an on/off button 607. The enclosure 601 also contains a microprocessor, an optional audio mixer and amplifier, and user device transceiver elements (defined above) and bar code reader. The bar code reader 121 is coupled to user device enclosure 612 and has a bar code sensor 610 which protrudes from enclosure 612. The bar code sensor 610 may be illuminated using an light-emitting diode. In optional embodiments, the bar code sensor may be of a CCD type or a single point type (above).

Audio information is presented to an operator using the speaker and speaker grill 603. Visual information, preferably including private or sensitive information such as user account numbers, is presented using screen 611. An operator may enter command instructions and data for encoding into a command message using bar code sensor 610, keypad 605, and/or microphone 606.

In one particular alternative preferred embodiment, user device 120 is a combination device, meaning that user device enclosure 612 is coupled to a wireless transceiver "base" 601; that is (in-turn) coupled through a telephone access line to telecommunication path 130. User device 120 is powered by the battery in wireless transceiver handset 612, and when the wireless transceiver handset 612 is "engaged" at the wireless transceiver "base" 601 the handset battery is recharged from AC line power source.

The radio link between wireless transceiver handset 601 and the transceiver in user device enclosure 612 may use an analog or a digital protocol. Analog protocols are commonly less expensive, but digital protocols have several advantages including e.g. more channels, greater immunity from noise, and better security features.

Digital radio transceivers are radio modems. Messages are transferred using data packets. Voice messages are converted to digital format with a codec type device prior to transmission. The digital representation of a voice message is transmitted in data packets using the radio modem, i.e., the digital radio transceiver. If security of transmission is an issue, the digital voice message may be encrypted prior to transmission. In the latter case, the user device 120 in enclosure 612 decrypts information messages from a host server 110 and the digital voice signals are then converted to analog voice signals (i.e., using a codec type unit in the user device transceiver, as defined above).

The wireless transceiver in handset 601 converts voice or data messages into a format suitable for transmission along telecommunication path 130 to host server 110. When using a digital link with the wireless transceiver is may prove advisable in certain applications (i.e., for security purposes) to have a modem in the user device transceiver coupled to the transceiver in handset 601. The latter method enables bi-directional encrypted voice and data communications between a host server and a user device 120 enclosure 612, thereby securing the telecommunication link.

Analog Devices of Sunnyvale, Calif. provides a family of chips (e.g., part numbers "MAX 2420" and "MAX 2460") operable in the 900 MHz range that are representative of RF transceivers useful in both the user device 120 enclosure 612 and the wireless transceiver handset 601. Other representative chips, so useful, include those manufactured and sold as the "Z87000™" and "Z87010™" products by Zilog, Inc. of Campbell, Calif.

Wireless transceiver handset 601 includes an antenna 600, a speaker and speaker grill 604, and wireless transceiver "base" includes a power cable 608 coupled to a power source, and a telephone cable 609 coupled to the telephone line 131. Wireless transceiver handset 601 contains a radio frequency (RF) transceiver for connecting to the "base". The transceiver in the user device 612 is coupled to a host server 110 through the RF transceiver in handset 601; that is in-turn, coupled to the transceiver in the wireless base; that is in-turn, coupled to the telephone line; that is in-turn coupled to telecommunication path 130; that is in-turn coupled to the host server 110. The transceiver in user device 612 may include a modem (and other user device transceiver elements, as defined above) when digital protocols are to be used.

Bar Code Command Cards

Figure 7:
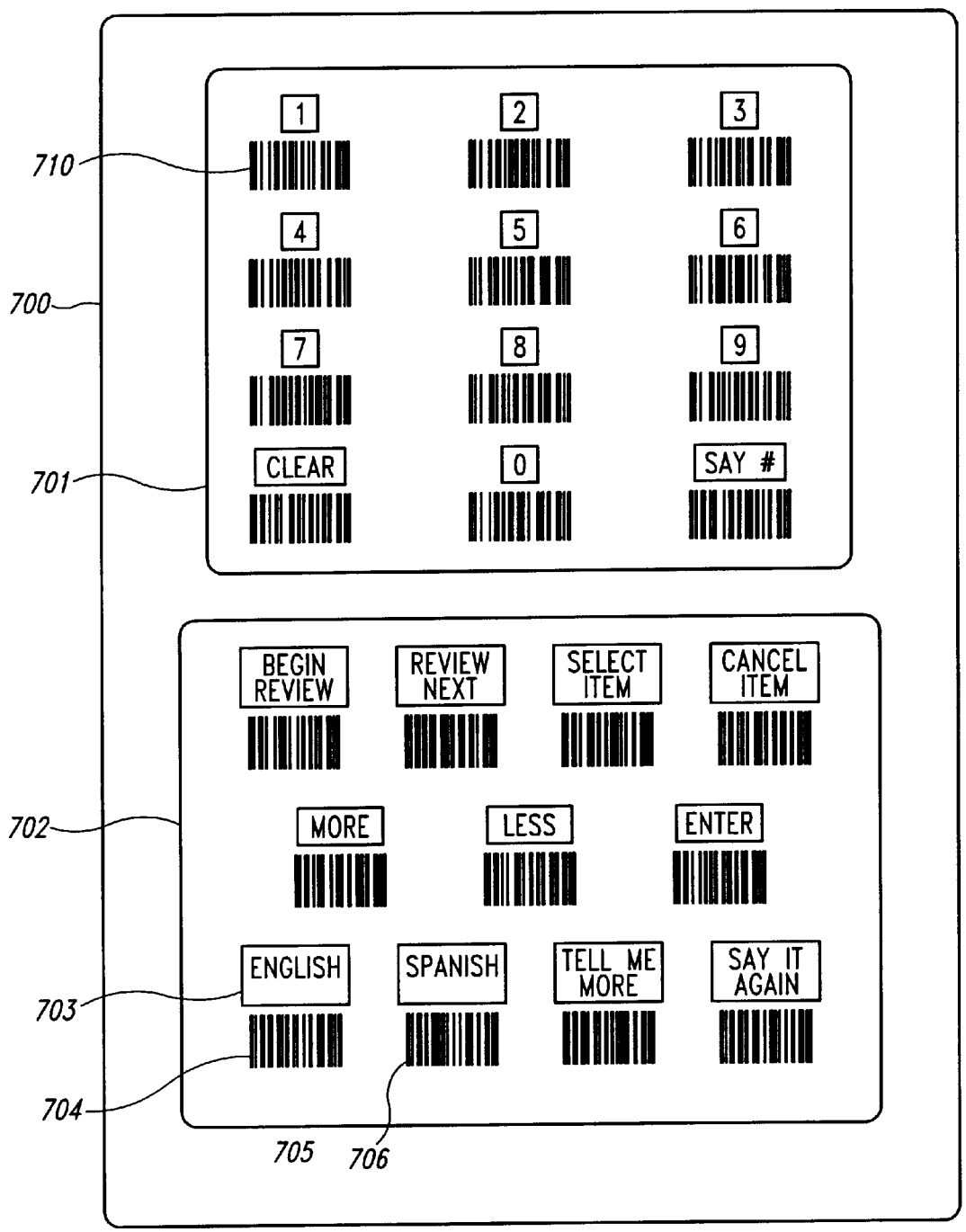
FIG. 7 illustrates a first bar code command card.

FIG. 7 depicts a first bar code command card having a series of command instructions for encoding a command message.

Command card 700 includes a set of bar codes 710 capable of being identified and scanned by bar code reader 121 and having at least guide bars to indicate the beginning and end, a check digit to identify reading errors and a code of one or more characters that is assigned to a selected command instruction.

In a preferred embodiment, command card 700 includes relatively heavy paper stock having a relatively light color and laminated. Command bar codes 710 are printed thereon in relatively high contrast black or blue-black ink. However, those skilled in the art will recognize that command card 700 and command bar codes 710 may include other means other than ink and printing for physically embodying a set of bar codes. Representative examples of means other than ink include imprinting plastic, metal or card stock with bar codes, e.g., by anodizing, embossing, engraving, etching, photoetching, stamping, xerography, or other techniques designed to place symbols on objects.

In a preferred embodiment, command card 700 facilitates communication with the host server by enabling the relatively simple microprocessor in the user device 120 to direct a relatively sophisticated CPU in host server 110 by using bar coded command instructions that are delivered in a rapid, secure and error-free format to the host server. As used herein, "reading" bar codes means to sense (e.g., for directionality and errors) and scan (e.g., digitize the code) those bar codes with a bar code reader. As disclosed herein, reading command bar codes 710 allows microprocessor 122 in user device 120 to encode command messages for transmission to host server 110 which include command instructions allowing user device 120 direct the course of telecommunications with the server. In one presently preferred embodiment, each bar code 710 includes a unique code recognizable by microprocessor 122 in user device 120 as a command instruction encodable into a command message for transmission to host server 110.

In a preferred embodiment, command bar codes 710 include a set of numeric keys 701 and a set of editing keys 702. The numeric keys 701 include one bar code 710 for each integer digit (useful e.g. for entering the number of units of an item to be ordered.) The command instructions encoded by command bar codes 710 also include numeric keys 701 that include one command bar code 710 for clearing digits already entered, (e.g., "erase" instructions), as well as, one command bar code 710 for requesting that already-entered digits be presented for review, (e.g., "review" instructions.) For review, host server 110 may encode an informational message to the user device directing that the message be presented as audio, (e.g., by speaking the numbers for the digits), or alternatively, the informational message may be presented on display screen 306, 401, 501 or 611.

Command bar code editing keys 702 each identify one command instruction to be encoded into a command message and transmitted to host server 110. Representative examples of command instructions assignable to editing keys 702 include: a first command instruction 703, encoded by a first bar code 704, that directs the host server 110 to respond in English with an audible informational message, (e.g., using speech synthesizer 114); and, a second instruction 705, encoded by a second bar code 706, that instructs host server 110 to respond with audible (or screen display) in Spanish.

In a presently preferred embodiment, command bar coded editing keys 702 include one or more consumer order instructions and, in particular, instructions suitable for use with order processing element 111. Representative examples of consumer order instructions, so applicable, are disclosed in TABLE 7-1.

TABLE 7-1

| Instructional Command: Ordering | Description of Command Message to be Encoded |
|---|---|
| BEGIN REVIEW | Present an informational message that reviews a current item in a present order. |
| REVIEW NEXT | Present an informational message that reviews the next item in a present order. |
| SELECT ITEM | Select the current item in a present order. |
| CANCEL ITEM. | Cancel the current item for a present order |
| MORE. | Order more units of the current item. |
| LESS. | Order fewer units of the current item. |
| ENTER. | Enter the order for the current item. |
| TELL ME MORE. | Present an informational message that gives more information about the current item. |
| SAY IT AGAIN. | Present the past informational message again. |

Figure 8:
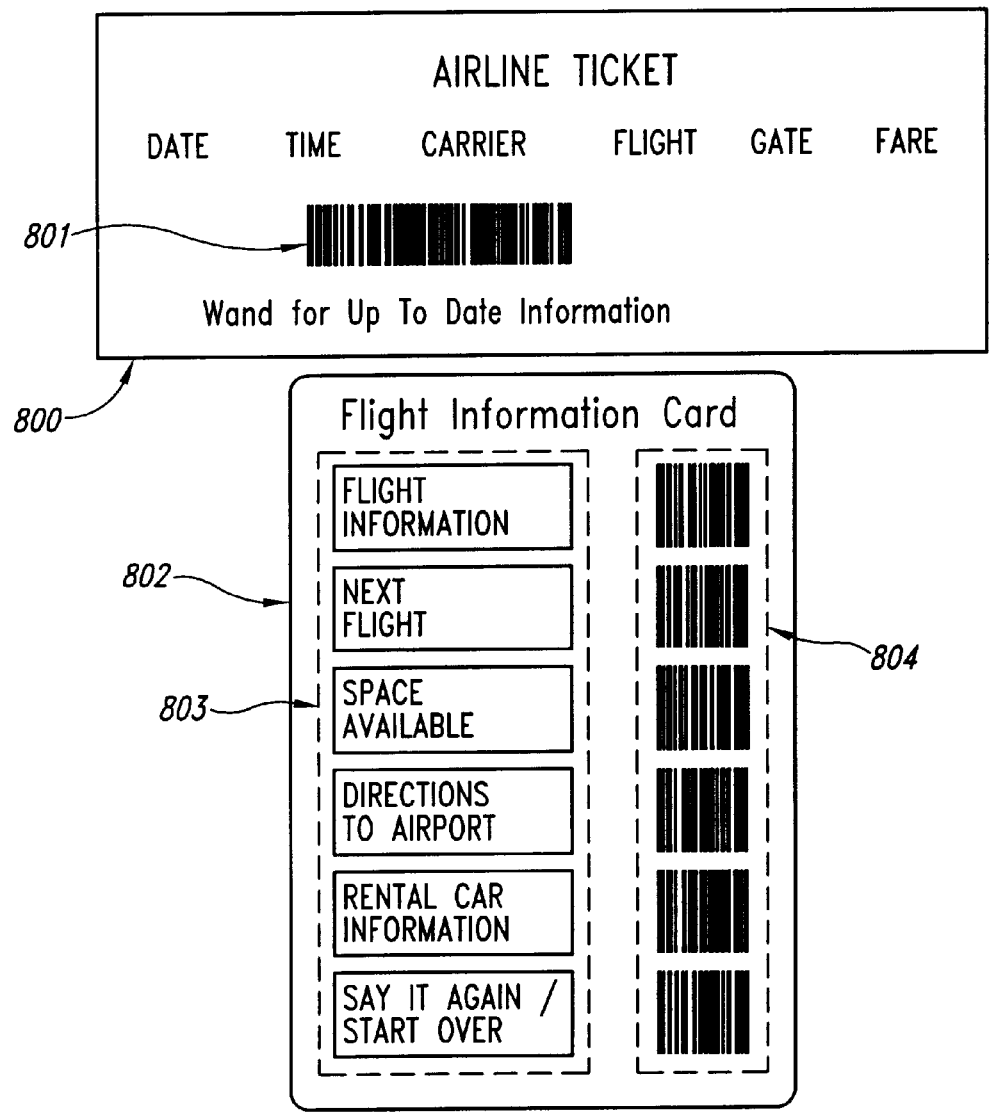
FIG. 8 illustrates command cards such as may be useful in an alternative embodiment for obtaining airline information.

FIG. 8 depicts command cards for an embodiment useful for obtaining airline information including ticket purchases.

An airline ticket 800 according to one embodiment of the invention includes an identifier bar code 801 that provides a unique electronic identification (ID)/access code for the purchaser of airline ticket 800. In a preferred embodiment, the identifier bar code 801 is encoded with an instructional command encodable, and encryptable, into a secure, error-free command message that rapidly provides a user with secure electronic access to host server 110. Representative examples of host server 100 in this particular embodiment of the invention include, a CPU of a transportation or travel company such as an airline, bus, rail, travel agency, car rental, shipping, trucking and the like; or alternatively; and, a CPU at a center servicing the needs of a transportation or travel company. The subject embodiment is useful for obtaining access to informational messages transmitted from host server 110, e.g., flight gate information, arrival and departure schedule changes, verification of reservation, and the like.

Operationally, reading an identifier bar code 801 with user device 120 results in transmission of an instructional command to the host server 110. Preferably, microprocessor 122 in user device 120 interprets the instructional command from bar code 801, identifies the airline (from the bar code on ticket 800), and selects from memory the phone number for the airline host server 110. In an alternative embodiment user device 120 may first initiate a transmission to a control center server that then directs the user device 120 to an appropriate airline host server 110. Representative informational messages transmitted to the user device 120 from an airline host server 110 may include visual and/or audio information about the particular flight associated with the unique ID (i.e., encoded by the bar code on airline ticket 800), e.g. whether the flight is on time, gate information, schedules for connecting flights and the like.

In one presently preferred representative embodiment, command card 700 includes bar codes 710 useful for obtaining airline information and including the following representative command instructions appearing in TABLE 8-1, on the following page.

TABLE 8-1

| Instructional Command: Airline Information | Description of Command Message to be Encoded |
|---|---|
| FLIGHT INFORMATION | Present an informational message with flight information for a selected flight. |
| NEXT FLIGHT | Present an informational message regarding the next flight after the selected flight. |
| SPACE AVAILABLE | Present an informational message regarding space available for the selected flight. |
| DIRECTIONS TO AIRPORT. | Present an informational message giving directions to the airport. The user device supplies the host computer server with the location of the user, either from a memory or using a GPS locator or other location technique. |
| RENTAL CAR INFORMATION. | Present an informational message regarding rental car information at the termination point for the selected flight. |
| SAY IT AGAIN/ START OVER. | Present the past informational message again from the beginning. |

Figure 9:
FIG. 9 illustrates a first command card such as for use with an embodiment regarding order approval.

FIG. 9 depicts a first representative command card useful in embodiments of the invention for obtaining approval for a customer order.

In one presently preferred embodiment, as a response to a command instruction in a command message from user device 120 the host server 110 transmits a facsimile informational message 900 to a pre-programmed telephone number connected to a facsimile machine 140, (e.g., a FAX machine designated by the account-holder.) The facsimile informational message 900 includes a description section 901 for the order, an approval bar code 902, (e.g., to be employed by used device 120 in approving the order), and an editing bar code 903, (e.g., to be employed by user device 120 in editing the order.) By reading the approval bar code 902 user device 120 indicates that the information stated in the description section 901 is correct and "approves" the order; and, by reading the editing bar code 903 the user device 120 encodes a command message for the order to be edited and/or deleted.

In presently preferred embodiments, the command to "approve" an order (above) causes host server 110 to transmit an informational message that is audible (and/or for screen display) requesting (as a security measure) that (i) the operator of user device 120 read a "user ID bar code" (in the possession of the authorized account holder on a "user ID card"); or, alternatively, (ii) that the operator of provide voice input for verification. Reading the "user ID bar code" just before (or after) reading "approval" bar code 902, provides an additional security measure to control unauthorized use.

Figure 10:
FIG. 10 illustrates a first command card such as for use with an embodiment regarding order approval.

FIG. 10 depicts a second representative command card useful following approval of a customer order, e.g., for determining delivery dates, status and the like.

Following order approval (above), host server 110 preferably sends a confirmation-FAX informational message to facsimile machine 140. Confirmation facsimile 1000 preferably includes a description section 1001 (e.g., listing the items ordered), a confirmation section 1002 (e.g., summarizing the approval/verification information provided by the operator), and providing a printed a status bar code 1003 (e.g., useful for requesting the status of the order).When user device 120 is operated to read status bar code 1003, microprocessor 122 transmits a command message containing command instructions for host server 110 to present visual and/or audio information concerning the status of the order.

Methods of Operation

Figure 11:
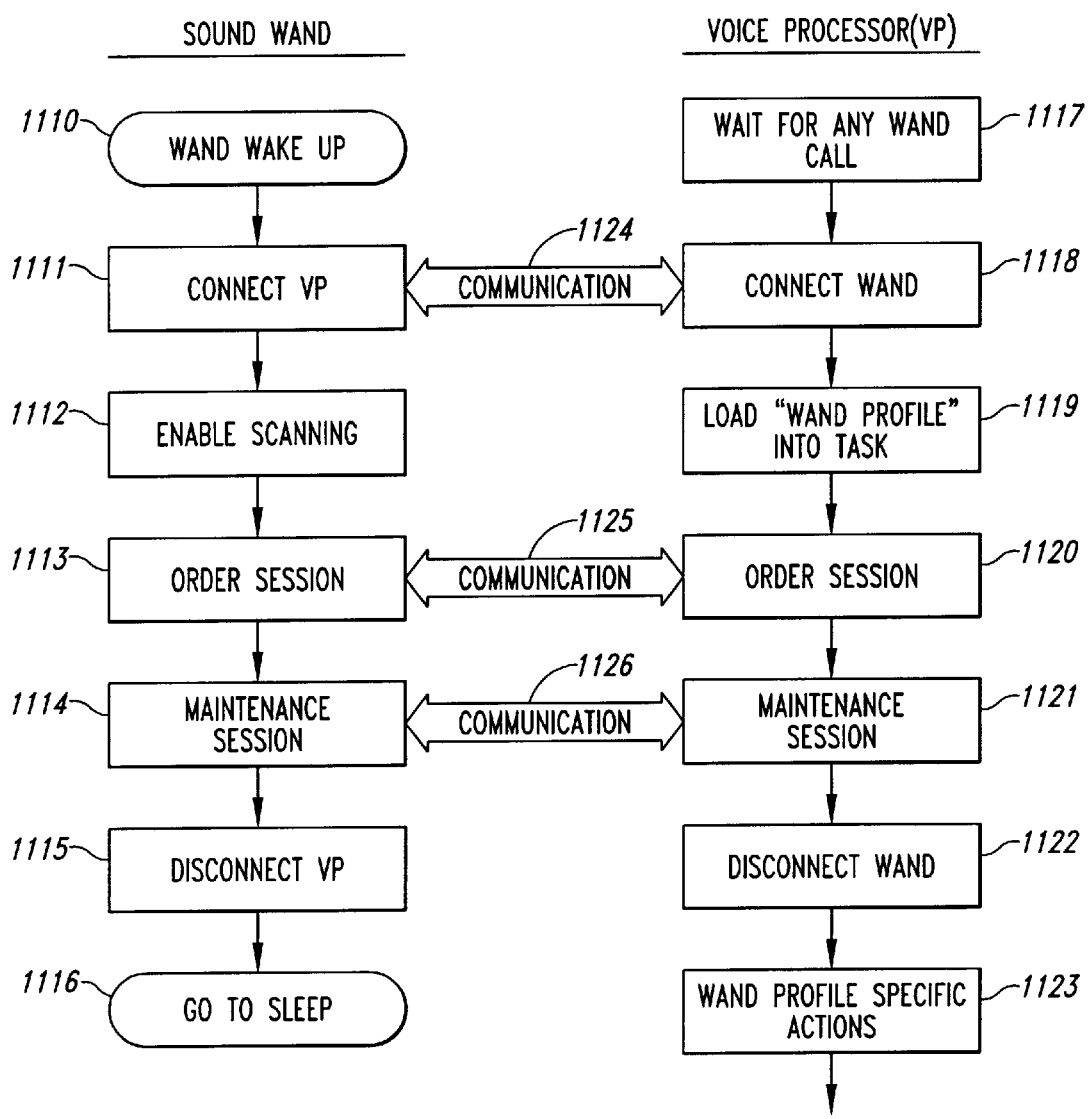
FIG. 11 shows a process flow diagram for the present method of using the user device according to the accompanying disclosure, below.

FIG. 11 depicts a representative process flow diagram for operating a user device to control a host server including a method and steps for operating the user device.

At a flow point 1100, the operator initializes the user device.

At a step 1110, the operator causes user device 120 to awaken from a dormant state. In a preferred embodiment, the user engages the on/off button 302 to power-on user device 120. In an alternative preferred embodiment, user device 120 powers-up (itself) from a low-power dormant state in response to a proximity signal received from the bar code reader. Upon awakening, user device 120 resets the memory and state of its microprocessor, and proceeds to reading the bar code (if one is present).

During the step 1110, the host server 110 performs a step 1117, in which it waits for a signal, e.g., a "ring signal" to initiate connection with user device 120.

At a step 1111, the user device 120 couples to the host server 110 using communication path 130. In a preferred embodiment, user device 120 places a call on local telephone line 131 to host server 110. (As disclosed above i.e., in regard to FIGS. 3–6 above, local telephone line 131 may include a land-line, a wireless telephone line, or a wireless connection to a land-line and/or a wireless telephone connection to a telecommunications local operating company).

Figure 12:
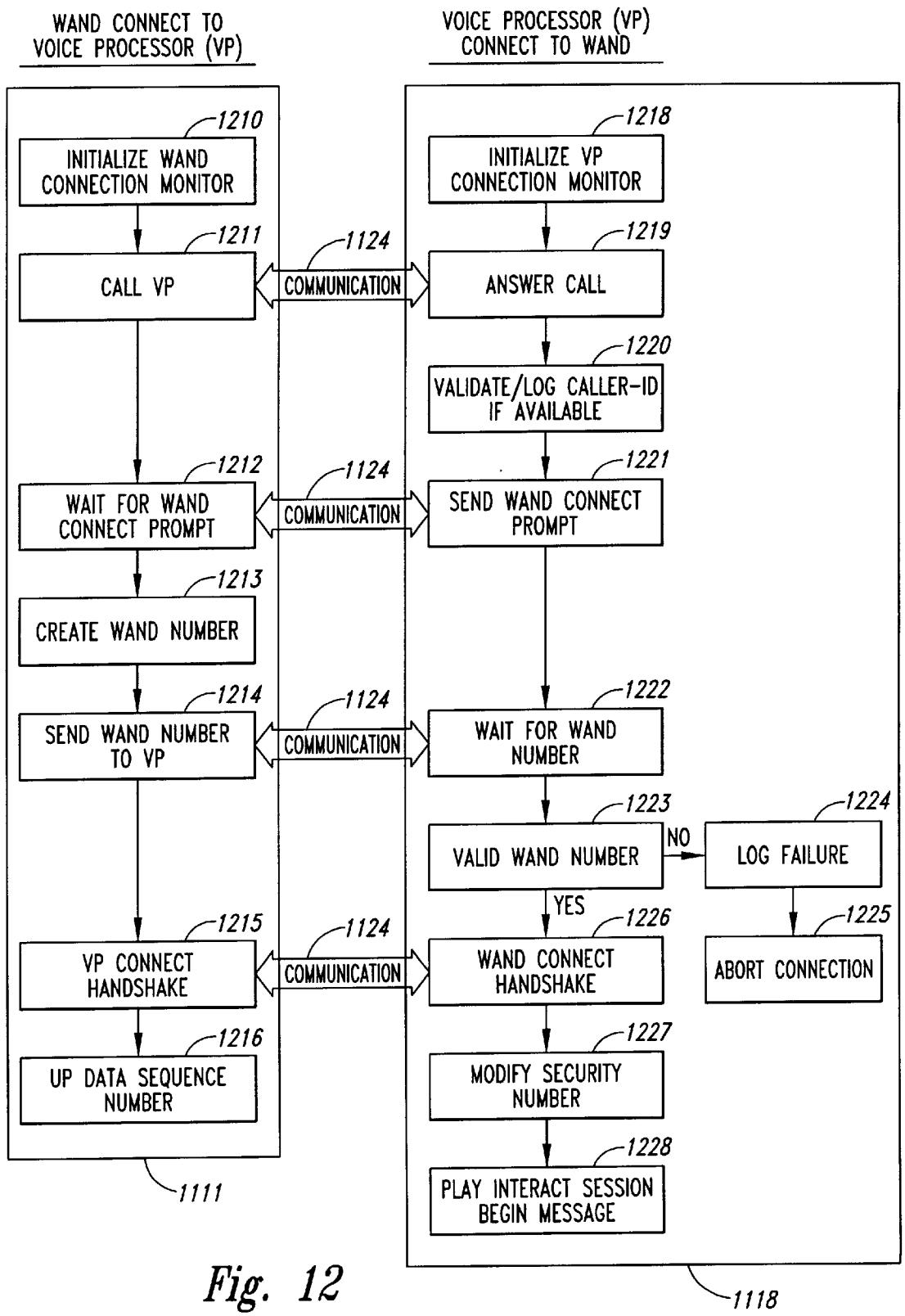
FIG. 12 shows a process flow diagram of the present method for coupling the user device and a host server.

The step 1111 is further described making reference to FIG. 12.

At step 1111, host server 110 performs step 1118, in which it receives the signal from user device 120, e.g., the telephone call, on host telephone line 133. In a presently preferred embodiment of step 1111, host server 110 allocates a single host telephone line 133 and a single task (or time slice) of a multitasking program application to respond to each different user device 120, i.e., each task operates independently and concurrently.

Step 1118 is further described making reference to FIG. 12.

At a step 1112, user device 120 enters a state capable of conducting and processing bar code reading or an input from the operator (e.g., keystroke data or voice).

During step 1112, host server 110 performs step 1119, in which it locates the user device profile for the particular user device 120, i.e., in a database of user device profiles. A representative illustration of a set of database information compiled as a user device profile is disclosed in TABLE 11-1, below

TABLE 11-1

| User Device Profile: Data Compiled | Description |
|---|---|
| USER DEVICE ID | A unique identifier for the user device |
| USER ID | A set of unique identifiers for user authorization to operate the user device. |
| ENCRYPTION PARAMETERS FOR USER DEVICE | One or more passwords and/or other encryption parameters to insure secure communication with the user device. |
| SEQUENCE NUMBER | A unique identifier associated with the most recent access session conducted by the user device, (as disclosed herein, below.) |
| STATUS FLAGS | Information regarding the status of the user device, (e.g., use of sequence number as disclosed herein.) |

At step 1113, user device 120 prepares to conduct an order session with host server 110. Order session and step 1113 are further described herein in regard to the disclosure attendant to FIG. 13.

During the step 1113, host server 110 performs a step 1120, in which it conducts an order session with the user device 120. (Step 1120 is further described herein in regard to the disclosure attendant to FIG. 13.)

During step 1113 and step 1120, user device 120 and host server 110 engage in an order session.

At a step 1114, user device 120 enters a state in which the user device 120 may conduct a maintenance session with the host server 110, e.g., to update user device protocols, ID codes, telephone numbers, sequence numbers, operating variables, and the like. In regards to the latter maintenance, engaging "ON/OFF" button 302 may be used to direct user device 120 to conduct a maintenance session with host server 110.

During the step 1114, host server 110 performs step 1121, in which it conducts a maintenance session with the user device 120.

During a maintenance session host server 110 and the user device 120 check and update both access sequence numbers in both units. (Access sequence numbers are further disclosed in the inventor's U.S. application Ser. No. 08/480, 614, now U.S. Pat. No. 5,696,824, filed Jun. 7, 1995, incorporated herein by reference.) Maintenance tasks that may be conducted during a maintenance session include e.g., collecting and updating usage statistics; conducting a host computer setup; updating user device communication protocols, ID codes, user profiles (above); and the like.

At step 1115, user device 120 disconnects from communication path 130. In a preferred embodiment, the user device 120 performs the latter step by "hanging up" data packet to host server 110 and then disconnecting the local telephone line 131 from the telephone connection to the host computer server 110.

During step 1115, host server 110 performs step 1122, in which it records the disconnect in telecommunication path 130 and terminates the application task associated with the session with user device 120.

At a step 1116, the user device 120 returns to a dormant state.

During the step 1116, host server 110 performs step 1123, in which it performs applications tasks associated with the user device profile and updating of the user file to reflect the recently-ended session.

FIG. 12 shows a representative process flow diagram for one secure method for coupling the user device and the host server.

User device 120 performs application step 1111 by performing the component steps 1210 through 1216. The host server 110 performs the application step 1118 by performing the steps 1218 through 1228.

At step 1210, the microprocessor in user device 120 is initialized and takes the line 131 "off hook". Going "off-hook" establishes power for user device 120. If a bar code media is detected by the proximity detector then microprocessor 122 initializes bar code reading. The bar code number is stored in RAM of microprocessor 122. If the bar code number corresponds with a "telephone number code" stored in microprocessor 122 a telephone call is placed to that number. If the bar code number does not correspond with a "telephone number code" the default telephone number for host server 110 is used to place a call. User device 120 calls the host by sending DTMF (or MF) tones on communication path 130.

At a step 1211, user device 120 places a telephone call to host server 110. In a presently preferred embodiment, user device 120 uses its DTMF (or MF) tone generator 125 to establish contact with host server 110. Preferably, the user device 120 also includes a call process tone detector (CPT), or digital signal telephone line state detector, capable of determining the status of communication path 130.

At step 1218, host server 110 monitors the communication path 130 for incoming calls.

During the step 1211, the host server 110 performs step 1219, in which it answers and receives the telephone call from user device 120.

In a presently preferred embodiment where "caller ID" services are provided, at a step 1220, the host server records (for future validation at step 1223, below) the originating telephone number of the calling user device 120.

At step 1221, the host server 110 transmits a connect-prompt message to user device 120. In one presently preferred embodiment, the connect-prompt message includes an audible signal, e.g., an "answer tone" generated by a modem in transceiver 123 or synthesizer 114.

During step 1221, user device 120 performs step 1212, in which it awaits the connect-prompt message from host server 110.

At a step 1214, user device 120 transmits a command message that includes one or more sets of identifying information (e.g., user device ID code, password and the like) to the host server 110. The identifying information preferably includes one or more the following: namely, a user device ID code number (i.e., unique to each particular different user device 120); a user ID number or password (i.e., to identify the account holder responsible for charges made by the user device 120); and, a sequence number (i.e., for the particular access session with host server 110). The subject sequence number is further described in the inventor's incorporated patent application disclosures (above).

During step 1214, host server 110 performs step 1222, in which it awaits the identifying information being transmitted as a command message by the particular user device 120.

At step 1223, the host server 110 authenticates the subject identifying information from the particular user device 120 including the telephone number recorded at step 1220, above. If the host server 110 is not able to authenticate the identifying information, it proceeds to the step 1224. If the host computer server 110 is able to authenticate the identifying information, it proceeds to the step 1226.

In a preferred embodiment, authentication information, i.e., such as the representative information presented in TABLE 11-1, below, is stored in a protected memory 124, e.g., in a CPU "user profile" file (above) at host server 110.

In a presently preferred embodiment, a unique user device ID code (i.e., for each particular user device 120) is stored in a protected memory in microprocessor 122 of user device 120 at the time of its manufacture. (Protected memory is non-volatile memory (NOVRAM), such that the information stored therein is not lost when user device 120 is powered-down.)

Most preferably, encryption parameters are used by each particular user device 120 to encode command messages, and those parameters are also stored in the protected memory when the user device 120 is manufactured, serviced, and/or involved in a maintenance session. Authentication parameters constituting a user profile (above; e.g., a password, device ID, encryption parameters, etc.) may also be altered by an authenticated user, e.g., during a maintenance session.

In one presently preferred embodiment, at the beginning of an order session user device 120 and host server 110 both transmit the encryption parameters that will be used during the session to transmit command messages and informational messages along communication path 130. Encryption secures against the possible reading or altering of the subject messages e.g., by an unauthorized party. Preferably, the encryption parameters specify a key or set of keys to be used for encryption, representative examples include encoding using "DES", "RSA" or "IVES" data encryption standards.

Those skilled in the art will of course recognize that, (at the discretion of a user and/or supplier) it may be considered unnecessary in certain applications (i.e., a secure limited-use environment) to verify or authorize a user. Under the latter conditions of use, the step of reading a user ID bar code may be optional.

As an additional security measure, a sequence number is generated both in user device 120 and host computer 110 for use in each session and the information is stored in memory at both units as an additional security measure against unauthorized use. The information is stored in protected memory of both units, and updated after each access session between a user device 120 and a host server 110, (e.g., according to methods disclosed in U.S. Ser. No. 08/480,614, now U.S. Pat. No. 5,696,824, and 08/485,083, now abandoned; both filed Jun. 7, 1995; both disclosures, incorporated herein by reference.) In optional embodiments where a user device is employed to access more than one different host server 110, the user device 120 may store more than one sequence number, such as one sequence number for each different individual host server 110 that has been accessed. Representative illustrative sequence numbers and their use are further disclosed in the inventor's incorporated patent application disclosures (supra).

At step 1224, host server 110 logs an access failure. The process step may including sending an electronic mail (or FAX) message to the security administrator at the account holder's address.

At step 1225, host server 110 terminates the telephone connection.

At step 1226, host server 110 performs a connection handshake with the communication element, e.g., the modem, in user device 120. A representative illustrative connection handshake is disclosed in the inventor's incorporated patent application disclosures (supra).

During step 1226, user device 120 performs step 1215, in which the connection handshake with host server 110 is effected.

At step 1216, user device 120 updates its sequence number (e.g., for the just initiated session). Representative and illustrative means for updating the sequence number are further disclosed in the inventor's incorporated patent application disclosures (supra).

During step 1216, host server 110 performs step 1227, in which it updates its sequence number.

At step 1228, host server 110 retrieves a greeting message from storage 202 and transmits the subject informational message to the user device 120 for visual and/or audio presentation to the operator.

Figure 13:
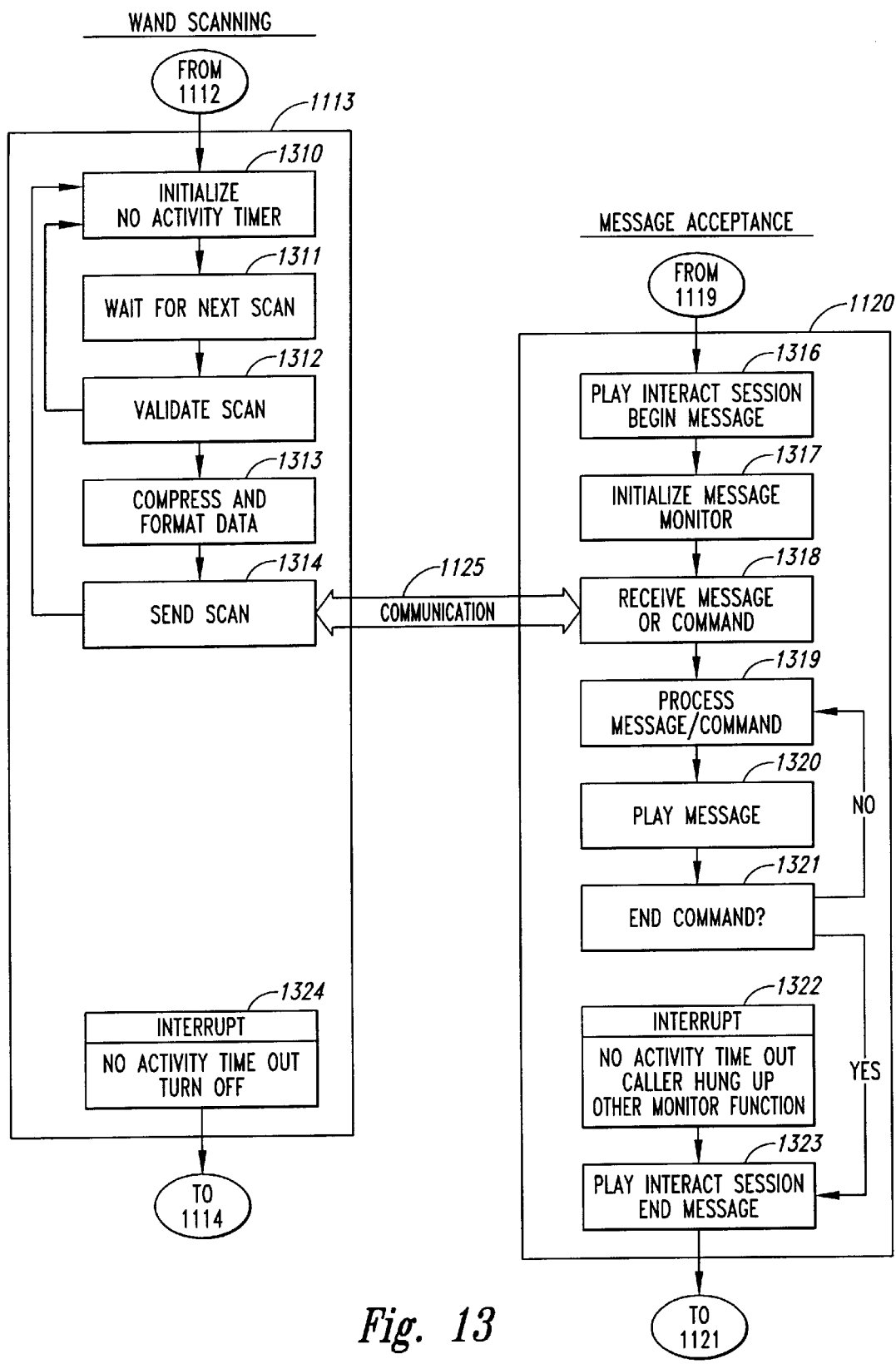
FIG. 13 shows a process flow diagram for an order session according to the present method.

FIG. 13 shows a process flow diagram for an order session.

In a preferred embodiment, the order session facilitates the user ordering goods and/or services from an order processing element 111 at host server 110. In general, each time a user operates bar code reader 121 or keypad 127, user device 120 will transmit data or commands to host server 110. Preferably, keypad 127 includes a set of physical keys that are used as "soft keys" (defined above) and may be used as numeric keys, alphabet keys, soft keys and/or special function keys. Representative special functions for "soft keys" are illustrated in TABLE 13-1, below.

TABLE 13-1

| Special Function Key | Description of Function/Process |
| --- | --- |
| YES | Answer "yes" to a question |
| NO | Answer "no" to a question |
| GO BACK | Go back to a previous menu choice |
| NEXT | Go forward to a next menu choice |

The functions of the respective soft keys is defined at host server 110, i.e., user device 120 sends a unique command message for each soft key and the application running in the host server 120 interprets the command instructions. Functions for the respective keys can be updated by changing the application software at host server 110.

The host server 110 contains program applications that respond to command messages by transmitting one or more informational messages to user device 120. The subject messages are presented to an operator e.g., on display screen 126 or speaker 128. Preferably, the host server 110 generates the subject informational messages in real time, e.g. by retrieving them from memory, or by dynamically digitizing them using speech synthesizer 114, or alternatively, by sending the information as modem communication signals to screen 126.

In a presently preferred embodiment, an order session may involve one or more of the following representative command cards and forms for encoding command messages: namely, command card 700 illustrated in FIG. 7, (described above); command card 800 depicted in FIG. 8; order approval form 900 illustrated in FIG. 9; or, order confirmation form 1000 depicted in FIG. 10.

In a presently preferred embodiment, the bar code reader in user device 120 is operated to read product code (e.g., UPC-6, UPC-12, EAN and the like) found on products in an order session where the user intends to order one or more of the subject consumer products. User device 120 bar code reader analyzes the signal reflected from the product bar code, determines the integer code and signals the information to microprocessor 122. Microprocessor 122 encodes and/or encrypts the data for transmission in a command message to host server 110.

Applications stored in the processor of host server 110 interpret the command message as e.g. an instruction to retrieve information descriptive of the subject product, the availability of the product, and/or an instruction to order the subject product.

Alternatively, user device 120 reads the subject UPC bar code, stores the information in short-term memory, and then waits for the user to read a second command bar code, e.g., from a command card or form (above). In the latter alternative step, the second command serves to indicate the context of the command message into which the subject UPC bar code signal will be encoded by the microprocessor. For example, if the command message bar code selected by the user indicates a command to order the product so identified by the subject UPC bar code, the UPC code is included in a command message interpretable by the host computer server 110 as "Order the following UPC coded item". Those skilled in the art will recognize that in the course of an order session it may be convenient for user device 120 to transmit a series of user-selected command messages designed to interrogate host computer server 10, e.g., to obtain additional product information; or, information on availability; or, possible alternative products; or, delivery dates; or, to interrogate a first host computer server 110 to obtain telecommunication access to a second host computer server 110 (e.g., in a different region) where an order may be placed (e.g., to expedite delivery of a backordered item).

In one presently preferred embodiment, user operates user device 120 to read one or more UPC bar codes, the encoded digital bar code information is transmitted to the host computer server 110 in a full-duplex mode, and in real-time host computer server 110 responds with an informational voice message or screen display (e.g., alphanumeric display) that identifies by name and/or product type of the subject UPC code selected by the user device. For example, if the subject UPC bar code identified for a box of pencils, applications in host computer server 110 are programmed to respond with the voice (or alphanumeric) informational message confirming to the user that "one box of pencils" has been transmitted and received by the host computer server. In this particular example, if the user wished to indicate more than one unit of the subject product, e.g., "two boxes of pencils", the number of units may be encoded and transmitted by user device 120 without the necessity of bar code reading the user device 120 keypad or bar code reader is operated in "count mode" to encode a command message that, when transmitted to host computer server 110 is associated with a program application indicative of a "unit count". Representative "unit counts" include, but are not limited to, a digit indicating the number of units of a product to be ordered; or, in an inventory mode, a digit indicating the number of times in a row of supplies that a particular product has been read by the bar code reader. In a first alternative preferred embodiment, the latter means for indicating a number of units of a bar-code-selected product is accomplished by user device 120 encoding and transmitting both a DTMF tonal code indicative of the number of units, and a digital communication signal representing the encoded subject UPC bar code signal (e.g., the user depresses a "touch tone" number key to indicate the number of units desired). In a second alternative preferred embodiment for indicating a number of units, user device 120 is used to read one or more bar codes on a command card (above) that are encodable into a command message indicating the subject unit count. In a third alternative preferred embodiment, user device 120 is used to read a command card bar code encodable into a command message interpretable by applications at host computer server 110 as "another unit of the same item indicated by the last transmitted UPC bar code signal". When operating in full-duplex mode, host computer server 110 responds in real time with an updated unit count, e.g., rather than repeating the entire product name, that may be displayed e.g. on the screen and/or on the speaker. As an additional optional real-time user friendly component of an order session, applications in host computer server 110 may be programmed such that when a user pauses for a preselected time period (e.g., between the 1st and 2nd time a particular product is indicated), the host computer server 110 transmits an audio informational message stating in a plural form the units count of the subject product(s). In the foregoing pencil example, if during the order session the user inadvertently (or intentionally) operated user device 120 to read the UPC bar code on a box of pencils five different times, the host computer server 110 will respond after each successive bar code reading with an informational message as illustrated in TABLE 13-2.

TABLE 13-2

| User Device Command Message: Unit Count | Host computer Server Speech Synthesizer: Informational Message Transmitted (Alternative Message After Time-Out Period) |
|---|---|
| UPC Code- 1st Time | "One box of pencils" |
| -2nd Time | "Two" ("Two boxes of pencils") |
| -3rd Time | "Three" ("Three boxes of pencils") |
| -4th Time | "Four" ("Four boxes of pencils") |
| -5th Time | "Five" ("Five boxes of pencils") |

In an optional preferred marketing and sales use for embodiments of the invention, user device 120 is employed to read bar codes in a printed media, (including e.g. advertisements, news media, product reviews, or scholarly articles), and a command message encoded and transmitted to a host computer server 110 so that the user is directly connected to (i) a source of additional product/sales or service information; and, (ii) a source for ordering the subject goods or services.

In a preferred embodiment, user device 120 is employed for a multimedia real-time interactive order session conducted between a user and host computer server 110 wherein a user is able to enter alphanumeric, bar-coded, and/or voice signals that are encodable and transmittable as command message to host computer server 110 and the subject user is also able to receive audio (e.g., speech or music) and/or visual display of informational message from the host computer server 110. The subject command and informational messages are transmitted in real-time and establish a path of interactive communication between the subject user and the host computer server order element useful for conducting the subject order session. Representative examples of interactive real-time messages that may be transmitted during an order session include at least, command message encoded answers to informational messages received from host computer server 110; or, user-initiated questions/queries directed to host computer server 110; or, informational messages transmitted from host computer server 110 to user device 120 containing answers to user questions/queries. For example, a user may operate the bar code reader 121, the keypad 307, or voice input in user device 120, to encode a command message that specifies a unit count (e.g., quantity of goods) to be ordered; or, a particular color or type of product; or, a particular product option;, or, a required delivery date. Host computer server 110 receives and processes the corresponding command messages, and their constituent encoded bar code signals, keystrokes, and/or voice input, according to program applications stored therein informational, and associates the information data transmitted in the command message with an order form, in such manner as to be capable of recording the subject information as an order entry by the account holder.

In a preferred embodiment, the user may operate user device 120 to enter one or more voice messages to be digitally encoded as a recognizable voice component of a digital command message transmitted to host computer server 110. The subject voice message may be entered either in response to an informational message from host computer server 110; or, on the user's own initiative, e.g., to enter special instructions for delivery or ordering such as "please deliver the package to the rear door," or "do not open the gate, the dog bites." The user device 120 encodes the voice message in a form that it is recognizable as voice, and not data, by host computer server 110. Host computer server 110 is capable of decoding a command message; identifying receipt of a voice message; recording the subject voice message (e.g., digitally, or with an answering machine); and associating the recorded voice message with the subject order, (e.g. by storing the digital voice message in a file linked with the order entry).

User device 120 performs step 1113 by performing the steps 1310 through 1324. Host computer server 110 performs step 1120 by performing the steps 1316 through 1323.

At step 1310, user device 120 initializes a "no-activity" timer that runs-down for a selected time period. After the selected time period, a program prompt is triggered to proceed to signaling o "interrupt telecommunications service". Pressing a key or reading a bar code resets the no-activity time. If an interrupt occurs, user device 120 proceeds to step 1324. Timer countdown interrupts are known in the art of telecommunication control.

At step 1311, user device 120 waits for a user to press a key or read a bar code. When the user presses a key, user device 120 stores keystroke in a short-term memory and returns to the step 1311. When user device 120 reads a bar code, it proceeds to step 1312. In either circumstance, user device 120 resets the no-activity timer (i.e., step 1310, above).

At step 1312, user device 120 microprocessor analyzes the bar code signal and verifies that correct bar code reading has occurred. If bar code reading has not occurred user device 120 proceeds to the step 1310. If bar code reading has occurred, user device 120 proceeds to step 1313.

At step 1313, user device 120 encodes a command message that may include one or more digitized bar code signals. The command message as encoded is formatted into one or more data packets. When possible, the command message is compressed, multiplexed and/or bundled to increase the speed of communication and media integrity codes included to insure error-free transmission to host computer server 110. The subject telecommunication process involving transmission of command messages and informational messages may be conducted in a half-duplex or full-duplex mode. Error free telecommunication signaling with time division multiplexing (TDM) and half- and full-duplex telecommunication signaling, i.e., with modem signal, are known to those skilled in the art.

At step 1314, user device 120 transmits the subject command message to the host computer server 110.

At step 1324, an interrupt is triggered by the no-activity timer, or the user has explicitly powered the user device 120 down; in either event user device 120 enters a dormant state. In the dormant state user device 120 is capable of minimizing its power requirements and minimizing the drain on a local telephone line 131 or on a battery, e.g., a wireless phone battery and the like.

At step 1316, host computer server 110 presents a visual or audio greeting message to the user.

At step 1317, host computer server 110 initializes a no-activity timer, operating in like manner to that described above in regard to user device 120, i.e., at step 1310.

At step 1318, host computer server 110 receives the subject command message from user device 120.

At step 1319, host computer server 110 verifies, decodes and processes the command message. Telecommunications applications and encryption applications running in host computer server 110 determine that the subject command message has arrived without alteration, error or loss during transmission; and, that encryption and content are properly formatted. Host computer server 110 processes the subject command message as further described with regard to FIG. 14. Command messages transmitted to host computer server 110 commonly result in selection and/or synthesis of an informational message to be presented to the user in real time.

At step 1320, host computer server 110 transmits a visual and/or audio informational message to the user device 120 for presentation to the user.

At step 1321, applications running in host computer server 110 determine whether a command message contains an encoded signal to terminate the order session. If so, the host computer server 110 proceeds to step 1323. If not, host computer server 110 proceeds to step 1318.

At step 1322, an interrupt is triggered by the no-activity timer operating within the host computer server 110, above, or alternatively, the no-activity timer within user device 120 has terminated communication.

At step 1323, if the communication process is still active, the host computer server 110 selects an informational "end-session" message from memory, or alternatively, synthesized and transmits the subject message to the user device 120 indicating an end e.g. to an order session.

Figure 14:
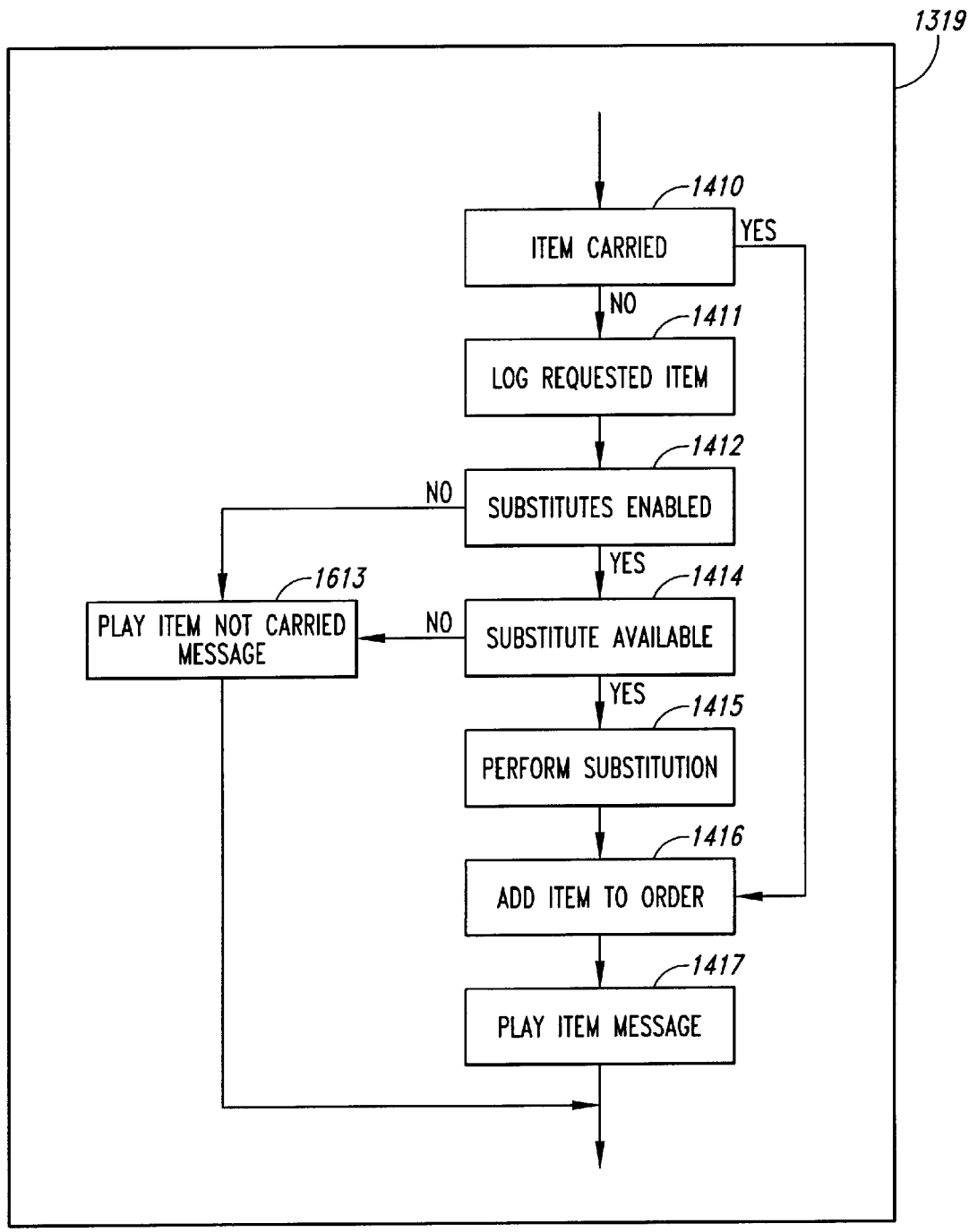
FIG. 14 shows a process flow diagram for an order session command message according to the present method.

FIG. 14 illustrates a process flow diagram for an order session command message.

Applications running in host computer server 110 performs step 1319 by performing steps 1410 through 1417.

At step 1410, host computer server 110 searches one or more memory databases containing information on available consumer goods and/or services to determine at least whether the subject product UPC code identified within a command message is (i) listed and/or (ii) available in inventory. If not listed or not available in inventory, host computer server 110 proceeds to step 1411. If the product is identified in a database and/or is available in inventory, the host computer server 110 proceeds to step 1416.

At step 1411, host computer server 110 logs the request for an item that is not available in inventory.

At step 1412, host computer server 110 determines whether a substitute product is available that can be offered to the user. If not, the host computer server 110 proceeds with the step 1413. If a substitute item is available, host computer server 110 proceeds to step 1414.

At step 1413, host computer server 110 selects an informational message from memory or synthesizes an information message in real-time, e.g. the product so identified by the UPC code is either not-carried, or not in inventory, or may be substituted by an alternative product. The subject "availability information message" is transmitted to user device 120 for visual and/or audio presentation to the user. Applications running in host computer server 110 then proceed to execution of the step after step 1319.

At step 1414, host computer server 110 searches one or more memory databases of available goods and/or services to determine whether a substitute item is available. If not, the host computer server 110 proceeds to step 1413. If the substitute item is available, applications running in host computer server 110 proceed to step 1415.

At step 1415, host computer server 110 replaces the original UPC-identified product with the substitute product.

At step 1416, host computer server 110 updates the current order by adding the substitute product item thereto.

At step 1417, applications running in host computer server 110 selects an informational message from memory (or synthesize a "status-update informational message" in real-time). The subject informational message indicates that the selected product item has been added to the current order. The "status-update informational message" is transmitted to user device 120 for visual and/or audio presentation.

Multi-Speed Modem and Data packet Signal and Speed Switching

It is desirable to make the user device run faster than about 300 baud (i.e., a Motorola modem). Speed is important in establishing "interactively" of use, i.e., by allowing for rapidly updating of audio and/or displays to the user and also for sending certain forms of encrypted data. The embodiments of the invention preferably employ a single speed modem and most preferably employ a multi-speed modem. In general, many multi-speed modems are unsuitable for use in the subject user device 120 without modifications to reduce power requirements. One representative example of a multi-speed modem which may be so-modified according to the invention, is a Silicon Systems multi-speed, i.e., 300, 600 or 1200 Baud, modem #73K322L™. The latter modem has greater power requirements as a single speed Motorola™ 300 Baud modem, and it also involves more external circuitry (i.e., amplifiers and passive components) which can consume power. Recognizing the problem, the multi-speed amplifier made useful according to the invention by incorporating "sleep mode" circuitry to offset the higher power requirements. When not in use, the modem amplifier goes to sleep and draws very little power. The latter sleep mode circuitry is consistent with the embodiments of the invention to conserve power (below). Certain other low power modems may be modified to incorporate sleep-mode circuitry to reduce overall power requirements while providing faster data transfer rates, e.g., 2400 Baud. Advances in DSP (Digital Signal Processing) make it very likely that even faster low power modems will be available in the near future. In general, the modems useful according to the invention, will (i) meet European standards (CCITT) or Bell (AT&T) communication standards; and, (ii) be adjustable to different baud rates in the event that user device 120 and server 100 encounter a poor telecommunication path 130 and need to decrease the transmission rates in order to establish error-free transmissions (disclosed below).

Automatically adjusting to different data rates and standards is known to the modem industry of "peer-to-peer" telecommunication, and the methods employed are referred to in the art as "modem negotiation". According to the art, modems first pass communication parameters at the lowest baud rate, usually 300 Baud. Next, the peer computers controlling the subject modems use each others modem parameters to decide the fastest and best way to communicate. "Modem negotiations" take place at the beginning of a data transfer session and can require three seconds or more to complete, even between intelligent "peers", (i.e., the negotiations by actual measurement for a Cardinal "Voice-View™" modem according to U.S. patent Ser. No. 5,365,577 were determined to be 3 seconds). The "negotiated" data rate is used for the duration of the session, unless the error rate is too high. If the error is too high, the modems re-negotiate a lower data rate and try again. "Modem-negotiations" are unacceptable for use as a step in the methods of the present invention because (i) the power requirements for negotiation can generally not be met by user device 120; (ii) microprocessor 122 is not a "peer" computer; and, (iii) the process is too slow for interactive communications.

Host computer server 110 is not limited by power and size restrictions. It can send and receive data using any data rate or other communications parameters that user device 120 is able to receive and process. According to the methods of the invention, user device 120 microprocessor 122 determines its available power (below) and transmits its baud rate and signaling requirements to the server 110. The server then adjusts telecommunications accordingly.

User device 120 employs one or more DTMF tones to generate "switch signals" (above) that allow the user device 120 and server 110 to toggle back and forth between audio and data. A DTMF tone tells the server 110 e.g. to stop audio output on the line and turn on one or more modems for data communication.

There are 16 standard DTMF tones (i.e., telephone keypad tones 0 to 9, *, #, A, B, C and D). According to the method of the invention (e.g., below), DTMF tones are used to eliminate power-intensive modem negotiations. In the latter case, one or more DTMF tones are transmitted by user device 120 to specify to server 110 which communication parameters are to be used in a session. If the ensuing communications error rate is too high, user device 120 sends a second DTMF or MF signal to specify a lower baud rate (below). "Negotiation" time for each "switch signal" is less than about 0.15 seconds, as compared with 10 seconds for the common "modem negotiations" used in the art.

A representative example of a single DTMF tonal frequency "switch signal" as may be assigned to data packet in a command message transmitted by user device 120 to host computer server 110 is provided in TABLE 15-1, below. The skilled artisan will of course recognize that two or more DTMF or MF tones may be assigned for data packet command switching.

TABLE 15-1

| DTMF Tone | Protocols |
|---|---|
| 0 | 300 Baud with AT&T standard procedures |
| 1 | 300 Baud with CCITT (European) procedures |
| 2 | 600 Baud with AT&T |
| 3 | 600 Baud with CCITT |
| 4 | 1200 Baud with AT&T |
| 5 | 1200 Baud with CCITT |
| 6 | 2400 Baud with AT&T |
| 7 | Switch to duplex mode |
| 8 | Switch to simplex mode |
| 9 | Set Parity to Even |
| 0 | Set Parity to Odd |
| * | Set check bits to 7 |
| # | Set check bits to 8 |
| A | Reserved |
| B | Reserved |
| C | Reserved |
| D | Reserved |

Data Packets and Telecommunications

Commonly, telecommunications between user device 120 and host computer server 110 is in full duplex mode (i.e., bi-directional and simultaneous), and/or half-duplex mode (talk and then listen). For instance, during the transaction phase at step 1125 (FIG. 13) communication may be half-duplex or full-duplex. More disclosed below, i.e., in regard to FIGS. 14 and 15. Although host computer server 110 is capable of initiating communication with user device 120, (e.g., to initiate a maintenance session or as a security check), under normal conditions of operation user device 120 initiates the communication with host computer server 110, i.e., by transmission of a command data packet.

Figure 15:
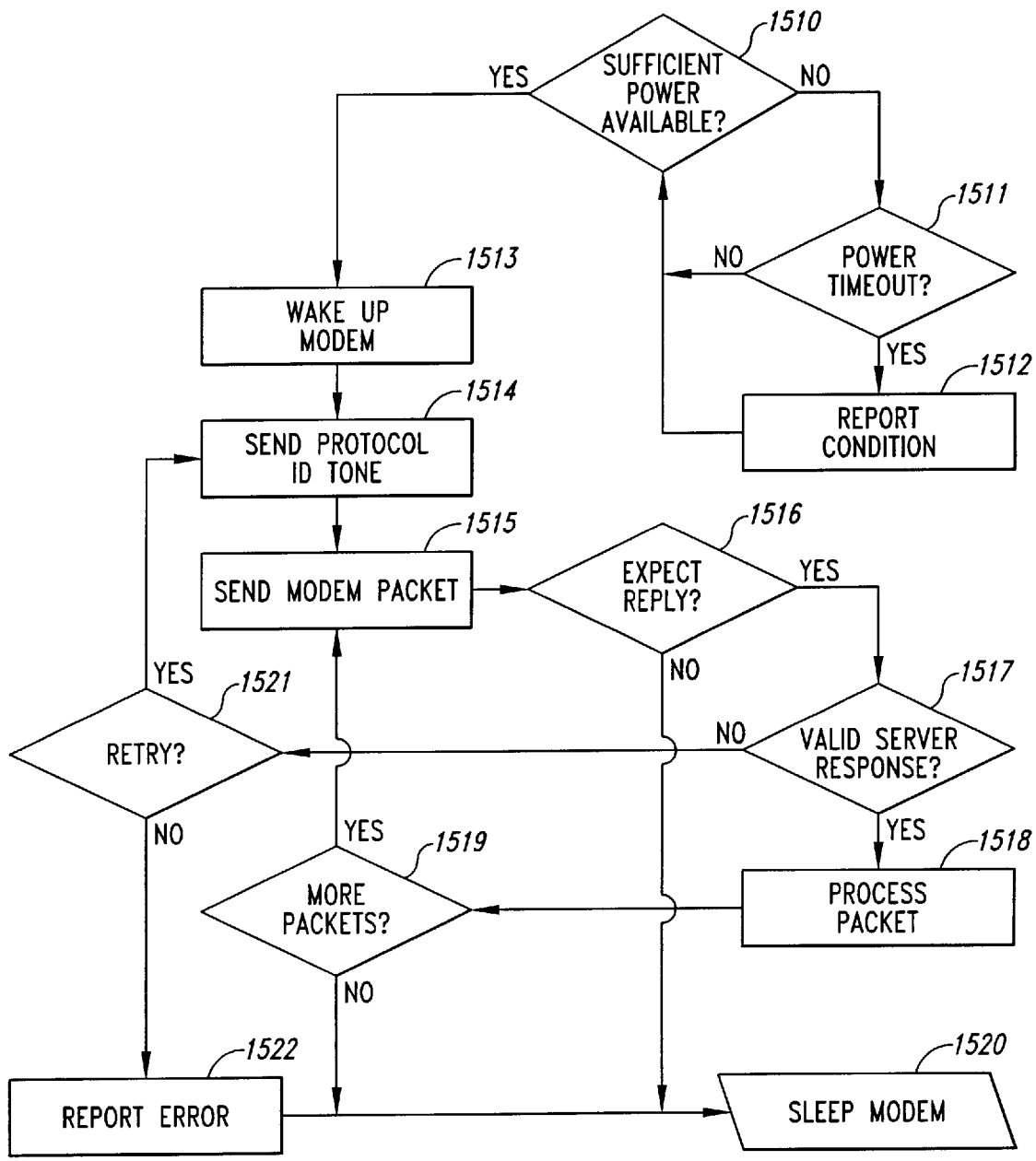
FIG. 15 depicts data packet transfer methods of the invention from the perspective of a user device.

Making reference to FIG. 15 depicting data packet transfer methods from the perspective of user device 120:

At step 1510, if the power condition is acceptable, (as disclosed below), microprocessor 122 provides current to "wake up" 1513 the transceiver 123, in this representative example a modem.

At step 1514, a protocol ID tone (e.g., a selected preprogrammed DTMF or MF tone) is sent to the host computer server 110 indicating a status ready to send command messages and/or receive informational messages. The protocol ID tone (i.e. a "switch signal", as defined supra) can be issued in less than about 0.15 seconds, i.e., a time significantly faster than the time required for a peer-peer modem handshake negotiation which requires several seconds.

At step 1515, a data packet is encoded and transmitted to host computer server 110. The data packet contains a "front porch", i.e., a repetitive "mark" signal lasting about 100 milliseconds which enables host computer server 110 to stabilize signal reception and synchronize the receiver before receiving a command data packet.

At step 1516, microprocessor 122 determines whether a reply is to be expected from host computer server 110, wherein the analysis is dependent upon the content of data packet transmitted at step 1515 (i.e., certain data packets do not result in replies, for example, a "heart beat" packet indicating to server 110 that user device 120 is still functional for the session in progress).

At step 1516, if no reply is expected from server 110, user device 120 goes into low power sleep mode 1520. Alternatively, if a reply is expected from server 110 then current is supplied to transceiver 123 until the subject informational message is received, decoded, and error-free media integrity insured (e.g., checksum or cyclic redundancy check, CRC, completed).

At step 1517, if media integrity is satisfactory (i.e., "valid") then user device 120 proceeds to step 1518 to processing of the packet, i.e., decoding and the like.

At step 1518, after decoding and de-encryption a determination is made as to the content of the information message received from server 110 and where/how that information is to be displayed.

If media integrity is not satisfactory (i.e., "invalid") at step 1517 (above), then user device 120 proceeds to step 1521 to make a determination of whether to repeat transmission of the data packet.

At step 1521, the user device 120 microprocessor 122 checks for a "status indicator", i.e., indicative of the last data packet transfer received by server 110. If the "status indicator" is not satisfactory e.g., due to an incorrect media integrity value, then a "retry counter" command line is accessed by microprocessor 122 to determine when or whether to resend the same data packet as at step 1515. If a "retry" instruction is initiated then user device 120 re-transmits data packet, i.e., returning to step 1514. In the event that there have been two or more unsuccessful "retry" attempts, user device 120 microprocessor 122 may instruct to choose a different protocol ID tone, e.g., indicating communication with server 110 at a different (slower, or more reliable) baud rate. If even the different baud rate fails on the "retry", then user device 120 may execute an "error" display message at step 1522, i.e., at the screen and/or on the speaker.

Next, at step 1519, user device 120 makes a determination of whether there is a second data packet to be transmitted to server 110 in the ongoing transaction. If there are no additional data packets, user device calls a "time out" and at step 1520 puts transceiver 123 into low current sleep mode.

Figure 16:
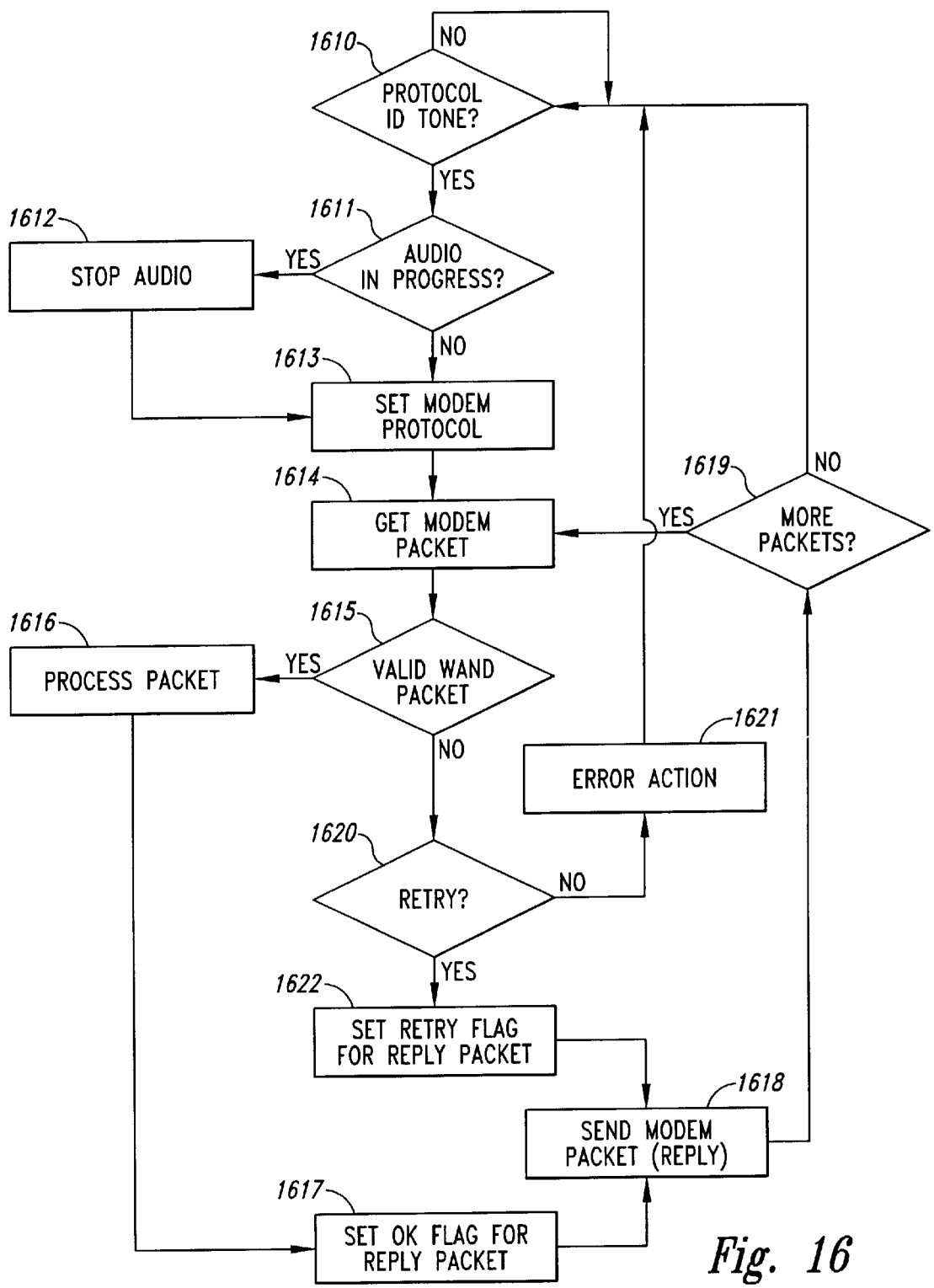
FIG. 16 depicts data packet transfer methods of the invention from the perspective of a host server.

Making reference to FIG. 16 depicting data packet transfer methods from the perspective of host computer server 110:

At step 1610, host computer server 110 continuously monitors for a protocol ID tone from user device 120. When a protocol ID tone is received, server 110 will (i.e., at step 1611) first check to determine whether audio circuits in the server are "on" or "off" (e.g., audio- "yes" or "no"?).

At step 1612, if audio is "on" then the server will execute instructions to "stop audio", i.e., to prepare for receipt of data.

At step 1613, server 110 proceeds to set modem protocols, i.e., baud rate, parity, and transmission mode, in preparation for receipt of data from the user device 120.

At step 1614, server 110 accepts the data packet (e.g., modem packet) transmitted by user device 120 and proceeds, at step 1615 to insure media integrity (i.e., validity). Valid data packets are processed, i.e., at step 1616, while a determination of invalidity instructs step 1620, i.e., "Retry?".

At step 1620, whether to send an optional "retry" informational message to user device 120 is based on similar determinations to those appearing above in step 1521, above, e.g., the number prior retry attempts. In the case of a first retry attempt, if the determination to "retry" is "yes", then at step 1622 the server directs an instruction (i.e., "Set Retry flag for reply packet) to the application running in server 110 to prepare for receipt of a data packet (i.e., "retry"), i.e., at steps 1618 and 1619. After several unsuccessful attempts have been made to receive a data packet from user device 120, server 110 at step 1621 identifies an error, as instructs a return to step 1610, i.e., to look for a new protocol ID tone (e.g., a switch to a slower baud rate or different communication parameters).

The subject methods allow for rapid adjustments (i.e., 0.15 seconds/each) to be made in initiating telecommunications contacts between user device 120 and server 110 without the necessity for lengthy (i.e., 3 seconds or more) power consuming modem handshake negotiations. Each data packet transmitted from user device 120 to server 110 has instructions for all of the following: namely, (i) turn voice/audio "off"; (ii) turn data communications "on"; (iii) set baud rate to 300, 600, 1200, or 2400; and, (iv) receive data packet.

Low Power Telecommunications Methods

Embodiments of the invention provide methods that makes the low power consumption of user device 120 possible. Most data transmissions are initiated by user device 120, thus, user device 120 is able to save power by maintaining its transceiver 123 in a low power "sleep" mode until it is needed for telecommunications. Since, the user device always knows when data is coming it can power up circuits only when they are needed for communications.

The modem is not drawing power when the following status is present in user device 120: namely, Bar code reader is using power to take a reading; or, Microprocessor 122 is using power to decode a telecommunication signal or a bar code reading signal; or, Audio system components (i.e., mixer, amplifier, and/or speaker) are using power to drive speaker 128 for audio presentation to the user; or, Transceiver 123 is active transmitting a command message to host computer server 110; or, Screen display 126 is active presenting visual information to the user.

Also, when transceiver 123 and/or screen display 126 are active, ), or when there is not audio or modem traffic on the telecommunication path 130, the audio system automatically go into sleep mode (i.e., low power).

Power Storage and Conservation

User device 120 contains multiple component circuits that all share a limited power source. Uncontrolled use of any single component circuit can break the budget of less than about 300 milliwatts, particularly the transceiver 123 circuits which can draw more than half of the total allowable current. In a presently preferred embodiment, user device 120 includes a power supply circuit that monitors the power stored in a capacitor or battery. A LBO ("low battery out") instruction indicates to microprocessor 122 that the storage element is nearly completely charged. Microprocessor 122 conducts an LBO check before enabling circuitry which draws significant amounts of power, e.g., a modem unit or the audio system. Microprocessor 122 also conduct an LBO check before enabling circuits needed for any data transmission. If an LBO check indicates that insufficient power exists for a data transfer, the user device 120 turns off all non-essential circuitry and waits for the storage power circuit to charge. Telecommunication lines provide maximum loop line currents when the line is silent, i.e., without voice communication. To facilitate charging, user device 120 may send a command message (e.g., a DTMF tone) to the host computer server to "turn off voice communications and wait". The latter command message facilitates re-charging of low power user device 120. User device 120 can periodically "report" to the host computer server 110 the status of power circuits, and in the application running in host computer server 110 can make its own determination of whether to signal an informational "time out" message, e.g., 'call back later' to the screen display. If the power condition is acceptable to microprocessor 122 provides current to "wake up" (i.e. step 1514, FIG. 15) the transceiver 123. A protocol ID tone (i.e., step 1514) is then sent to the host computer server 110 indicating a status ready to send command messages and receive informational messages. The protocol ID tone (i.e. a "switch signal", as defined supra) can be issued in less than about 0.15 seconds, i.e., a time significantly faster than the time required for a peer-peer modem handshake negotiation which requires several seconds.

A capacitor is used to store power and provides powers to the user device when the telephones line currents is insufficient to power active circuits. Power is limited when either user device 120 or server 100 is involved in transmitting and receiving telecommunication signals. The capacitor is selection is based on storing sufficient power to operate telecommunication circuits during loud or long voice or data messages and must be rated for high voltage and have very low leakage.

The voltage level of the capacitor is monitored by a voltage regulator. The LBO ("low battery out" signal, above) output of regulator is high when the capacitor is almost fully charged and in this manner microprocessor 122 can check the status of LBO ( and thereby power available from the capacitor) before initiating any function that requires a significant amount of power. LBO is checked before all telecommunication data transfers and before all bar code scans.

The User Device Answers the Phone

In alternative embodiments, the invention provide methods for user device 120 to answer a telecommunications call. For example, user device 120 could take a message for the user. It this case user device 120 must listen for a ring. This is a problem for most telephone line powered devices because line powered devices are not allowed to draw power to run circuits while "On Hook".

According to the methods of the invention user device 120 employs the power of the "ring signal" to turn on a relay coil. The relay then answers the "ring" by powering up the user device. This aspect of the invention may be used, e.g., when server 110 needs to initiate contact with user device 120 for a maintenance session, check security codes or usage records, or surreptitiously change encryption standards.

We claim:

1. A power conservation method for telecommunications between a handheld low power user device and a host server for transmitting an order, a voice message or a data message, comprising the steps of:

entering said order, voice message or data information at said handheld user device and preparing a data packet comprising said order, voice message or data information;

transmitting the data packet from a low power handheld user device to a host computer server on a telecommunication path;

receiving and processing the data packet at the host server and encoding and transmitting an informational message to the low power handheld user device, said informational message selected from among sound, voice or data;

receiving the informational message at the low power handheld user device and displaying said sound, voice or data;

wherein said transmitting, said receiving, and said displaying steps by said low power handheld user device are accomplished while the low power handheld user device is operating on electricity transmitted to the low power handheld device via the telecommunication path.

2. The method of claim 1, further comprising the step of maintaining the user device in a sleep mode when not involved in said transmitting, receiving, or displaying steps.

3. The method of claim 1, wherein the handheld low power user device comprises a communication transceiver, a microprocessor and an operator interface selected from among a keypad, a display screen, a bar code reader, a card reader, and an audio system comprising a speaker and a microphone, and the host server comprises a computer processing unit.

4. The method of claim 3, wherein the transmitted data packet comprises a bar code data, a card data, a key closure from the key pad data or a digital voice message data.

5. The method of claim 4, wherein receipt of the DTMF or MF switch signal code at the host server instructs a plurality of additional method steps comprising: switching voice communications off, switching data communications on and setting one or more communication parameters, wherein said communication parameters comprise a baud rate, a parity, a stop bit, a word size, and a modulation technique.

6. The method of claim 3, wherein the transmitted data packet is preceded by a DTMF or an MF switch signal code.

7. The power conservation telecommunication method for transmitting a telecommunication signals of claim 1, wherein the informational message comprises a voice message, a sound message, a data message, a visual message or a facsimile message.

8. A power conservation telecommunication method for transmitting a telecommunication signals from a handheld low power user device to a host computer server and for receiving telecommunication signals from the host computer server, said transmitting and receiving over a telecommunication path, said transmitting to issue a command instruction to the host computer server to transmit an informational message for reception by said handheld low power user device, wherein said handheld low power user device comprises a first power state incapable of sending or receiving said telecommunication signals and a second higher power state capable of sending and receiving said telecommunication signals, wherein said telecommunication signal comprises a switch signal code followed within about 1 second by a modem data packet, wherein said switch signal code comprises a dual tone multiple frequency signal or a multiple frequency signal;

wherein said handheld low power user device comprises a communication transceiver, a microprocessor and an operator interface selected from among a keypad, a bar code reader, a display screen, and an audio system comprising a speaker and a microphone, and wherein said host computer server comprises a computer processing unit;

wherein the method comprises the sequential steps of:

triggering a transition from the first power state to the second power state;

selecting at said handheld low power user device the command instruction for the informational message and encoding the instruction into the data packet;

encoding at said handheld low power user device the telecommunication signal and transmitting the telecommunication signal to the host server;

decoding and processing the telecommunication signal at the host computer thereby to identify the switch signal code;

responding to the switch signal code by turning voice communications off and turning data communications on; receiving said modem packet; and, processing said modem data packet thereby to identify said command instruction to transmit said informational message to the handheld low power user device.

9. A power conservation telecommunication method for transmitting a telecommunication signal from a handheld low power user device to a host computer server over a telecommunication path thereby to issue a command instruction to the host computer server to transmit an informational message to said handheld low power user device, wherein said handheld low power user device comprises a first power state incapable of sending said telecommunication signal and a second power state capable of sending said telecommunication signal, wherein said telecommunication signal comprises a switch signal code followed within about 1 seconds by a modem data packet, wherein said switch signal code comprises a dual tone multiple frequency signal or a multiple frequency signal;

wherein said handheld low power user device comprises a communication transceiver, a microprocessor and an operator interface selected from among a keypad, a bar code reader, a display screen, and an audio system comprising a speaker, and a microphone, and wherein said host computer server comprises a computer processing unit;

wherein the method comprises the sequential steps of:

triggering a transition from the first power state to the second power state;

selecting at said handheld low power user device a first command instruction for a first informational message and encoding the first command instruction into the data packet;

encoding at said handheld low power user device the telecommunication signal and transmitting the telecommunication signal to the host server;

decoding and processing the telecommunication signal at the host computer thereby to identify the switch signal code;

responding to the switch signal code by turning voice communications off and turning data communications on; receiving said modem data packet; and, processing said modem data packet thereby to identify said first command instruction to transmit said first informational message to the handheld low power user device; and selecting at said handheld low power user device a second command instruction for a second informational message, and repeating the remainder of the sequential steps thereby to receive the second informational message.

10. The method of claim 9, comprising the additional step of using a timeout counter at the host computer and the user device during the transmission of a data packet to allow identification and correction of errors.

11. The method of claim 9, comprising the additional step of using sequence numbers as a part of a media integrity code to identify and correct media integrity errors.

12. The method of claim 9, wherein the telecommunication path is a local area network telephone system, a telephone system a cordless telephone, a wireless telephone, a cellular telephone, a PBX telephone system, or an integrated services digital network.

13. The method of claim 9, wherein the telecommunication signal comprises a keypad key stroke, card information a bar code signal, or a media integrity code, encoded into a modem communication signal selected from among FSK, DPSK, or QAM.

14. The method of claim 9, wherein said low power handheld user device operates on less than 300 milliwatts of power.

15. The method of claim 14, wherein said low power handheld user device is powered by a current selected from among a telephone loop line current, a wireless telephone battery, and a power source circuit in said device.

16. The method of claim 9, comprising the additional steps of monitoring a power level at each step of the method to assure that sufficient power is available for the step to be performed; and placing the component circuits in said user device that are not involved in the method step into a low power sleep mode.

17. A power conservation telecommunication method for sending a message data packet from a handheld low power user device to a host computer server over a telecommunication media, wherein said handheld low power user device comprises a first power state incapable of sending said telecommunication signal and a second power state capable of sending said telecommunication signal, wherein said handheld low power user device comprises a low power voice and data modem, a microprocessor and an operator interface comprising a keypad, a screen display, a dual power amplifier, and a bar code reader;

wherein the host server comprises a modem and a DTMF or MF decoder and a central processing unit having an application program capable of interpreting DTMF or MF switch signal codes;

and wherein the method comprises the steps of:

maintaining the user device and the low power voice and data modem in an inactive low power sleep mode;
maintaining the DTMF or MF decoder and the modem at the host server in an active mode;
activating the user device and voice and data modem to said second power state in response to a signal selected from among a keypad key closure signal, a timer timeout signal, or a valid bar code reader signal card data;
transmitting a DTMF or an MF switch signal code from the user device to the host server followed by the message data packet;
receiving the DTMF or the MF switch signal code at the host server and processing the switch signal code to stop transmitting voice messages, to switch from voice communications to data communications, to set communication parameters, and to receive modem data packets; and
receiving the message data packet at the host server.

18. The power conservation telecommunication method of claim 17, further comprising the steps of adding a media integrity code to the data packet at the user device; checking for media integrity of the data packet at the host server; identifying an error and transmitting an error code message to the user device; and re-transmitting any message data packets that are identified as being in error.

19. The power conservation telecommunication method of claim 18, further comprising the step of transmitting an audio error message to the user device.

20. The power conservation telecommunication method of claim 18, further comprising the step of sending a voice message from the user device to the host server.

21. The power conservation telecommunication method of claim 17, further comprising the steps of adding a media integrity code to the data packet at the user device; checking for media integrity of the data packet at the host server; and failing to identify an error.

22. The power conservation telecommunication method of claim 21, wherein said information message comprises a voice message or a sound message.

23. The power conservation telecommunication method of claim 22, further comprising the step at the user device of switching data communications off and setting the dual power amplifier into a low power sleep mode and waiting for the voice information message from the host server.

24. The power conservation voice and data telecommunication method of claim 17, wherein the telecommunication media is selected from among a telephone wire, a cordless telephone connection, a cellular telephone connection an optical telecommunications cable, a radio telecommunications connection, a microwave telecommunications connection, and a satellite communication channel.

25. The power conservation voice and data telecommunication method of claim 17, comprising the additional step of testing for a user device power status before transmitting the DTMF or the MF switch signal code from the user device to the host server.

26. The power conservation telecommunication method according to claim 17, further comprising the steps of returning to a low power sleep mode:

the bar code reader after processing the bar code signal from the bar code reader and transmitting an output signal to the transceiver comprising the plurality of bar code digits, processing keypad information, processing digital voice information, or transmitting an output signal to the transceiver;
the microprocessor after sending output signal from the transceiver, transmitting the telecommunication signal to the host server, and receiving the informational message from the host server;
the transceiver after receiving the output signal from the transceiver, transmitting the telecommunication signal to the host server, and receiving the informational message from the host server; and
the audio system and speaker after playing an audio informational message from the host server.

27. A method for using a DTMF or MF signal having a duration of less than 1 second as a switch signal, said switch signal transmitted over a telecommunication path from a low power handheld user device to a host server that instructs the host server to:

switch the reception from a voice communication mode to a modem data communication mode;

set a modulation technique comprising a baud rate, a parity, a number of stop bits, a word size, a modulation technique;

and receive a modem data packet from the low power handheld user device.

28. The method of claim 27, wherein said low power user device comprises a bar code reader, a card reader, a screen display, an audio system having a microphone, a speaker, and a telecommunication modem, and a microprocessor.

29. A telecommunication method for low power, error-free, secured transmission of confidential information from a low power handheld user device to a host server over a telecommunication path, wherein the confidential information comprises a plurality of modem data packets, said modem data packets; the user device comprising a programmable protected and non-volatile memory, wherein said host computer processes the plurality of modem data packets and responds in an error-free and secured fashion by transmitting either a modem data packet or an analog voice message to the low power handheld user device;

wherein the protected memory is programmed to respond to a key stroke, an optical bar code data, card data, a bar code data, or a modem message from the host computer;

wherein the protected memory is programmed for use in a secure electronic commerce by storing an ID number, a credit or debit account number, an account balance, a spending limit, a postal address, an encryption parameter, algorithm, or an encryption key or seed for an encryption algorithm;

wherein the low power handheld user device transmits one or more of the program items in the protected memory in an encrypted format over the telephone media to the host server;

wherein the program items in protected memory are updated by a plurality of secure encrypted modem messages transmitted from the host server;

wherein one or more program items in said protected memory is presented to an operator in response to a program request issued the operator comprising one or more of a key pad password entry, a voice verification message entry, a card reader, and a bar code signal entry; and, wherein said voice verification message entry is encoded into a modem compatible signal by a coded unit and said encoded voice verification message entry is transmitted over the telephone media to the host server.

30. The method of claim 29, wherein said telecommunication path is selected from among a telephone wire, cordless telephone transceiver, cellular telephone transceiver a coaxial cable, an optical cable, a radiowave transceiver and a microwave transceiver.

31. The method of claim 29, wherein said low power handheld user device is powered by a current selected from among a telephone loop line current, a wireless telephone battery, and a power source circuit in said low power handheld user device.

32. The telecommunication method of claim 31, wherein the user device further comprises an audio telecommunication circuit, a bar code reader circuit, a card reader, an audio system circuit, a microphone circuit, said power source circuit, and a device that measures the amount of energy stored in the power source.

33. The method of claim 32, wherein said power source circuit comprises a capacitor or a battery.

34. The telecommunication method of claim 33, further comprising the steps of maintaining a low power requirement for the low power handheld user device by the steps of, measuring a level of available power in the power source circuit;

decreasing to a low level the power supplied to one or more of said selected circuits when the selected circuit is not required for said presentation of said audio or visual report or for the steps of reading or encoding, thereby to maintain a low power requirement for said low power handheld user device.

35. The telecommunication method of claim 29, wherein said command message comprises a data packet instructing the host computer server to place an order for one or more items, each of said items having a bar code, and each of said bar codes transmitted within said data packet.

36. The telecommunication method of claim 35, further comprising the steps of receiving said command message at said host computer server, processing said data packet thereby identifying said instruction to place an order;

initiating an order session at said host computer server in response to said command message;

instructing for the information message to comprise an order session item verification message for presentation on said screen or speaker in the low power handheld user device; and, transmitting said information message to the low power hand held user device.

37. The method of claim 36, further comprising the steps of compiling a bar code in a facsimile form document and transmitting said form document to a facsimile machine at a user site.

38. The method of claim 37, wherein said bar code comprises an instruction to said host computer server selected from among an order approval command message, an order editing command message and an order status command message.

39. The method of claim 36, further comprising the step of transmitting a command message instructing the host computer server to compile said information message in a language selected from among English, Spanish, French, German, Italian, Norwegian, Swedish, Russian, Japanese, or Chinese.

40. The method of claim 36, further comprising the steps of receiving said facsimile message from said host computer server, said facsimile message comprising said bar code;

reading said bar code in said facsimile message with the handheld low power user device; and encoding and transmitting a command message in response thereto to said host computer server.

41. The method of claim 29, wherein said informational message comprises information encrypted using a set of encryption parameters, said set of encryption parameters being held in a protected memory at said low-power handheld user device.

42. The method of claim 29, wherein said step of generating said informational message comprises a audio message produced from a digitally pre-recorded database coupled to said host computer server.

43. The method of claim 29, wherein said step of generating said informational message comprises an audio message having speech synthesized by a speech synthesizer coupled to said host computer server.

44. A system for communication with a host computer server, said system comprising a handheld low power user device having a bar code reader that reads a bar code and generating thereby a bar code signal;

a means for encoding a telecommunication signal comprising a command message having a data packet that in turn includes said bar code signal;

a means for coupling to a telecommunication path connected to said host computer server, and for transmitting said command message on said telecommunication path;

means for receiving at said host computer server the command message and for processing said bar code signal thereby to generate an instruction to compile an informational message comprising an audio or a visual message;

means for transmitting on said telecommunication path said informational message from said host computer server to said low power handheld user device; and means for presenting said information message at said low power handheld user device comprising an audio system or a visual screen.

45. The system of claim 44, further comprising a host computer server having a program application for receiving orders for goods or services, said host computer server comprising means for receiving said command message on said communication path; and, means for building an order for goods or services in response to said command message, and wherein said informational message comprises information regarding said order.

46. The system of claim 44, wherein means for compiling said informational message comprises a speech synthesizer.

47. The system of claim 46, wherein said informational message comprises a recorded voice signal.

48. The system of claim 44, wherein said means for receiving further comprises a communication signal decoder, a voice-recognition element or a voice recording element.

49. The system of claim 44, wherein said command message comprises an instruction to said host computer server to compile said informational message in a language selected from among English, Spanish, French, German, Italian, Norwegian, Swedish, Russian, Japanese, or Chinese.

50. The system of claim 44, further comprising means for receiving a facsimile message from said host computer server at a user site, said facsimile message comprising a bar code.

51. The system of claim 44, wherein said command message comprises a message selected from among: a data telecommunication signal, a voice message and a data telecommunication signal comprising a data packet having a bar code signal or card data.

52. A system for telecommunication between a handheld user device and a host computer server, wherein said user device comprises a bar code reader, an audio system, a screen display, a telecommunications transceiver, a microprocessor having less than about 128 Kbytes of PROM and less than about 8 Kbytes of RAM, and a power supply providing to said user device less than about 300 milliwatts of power available for operation, said system comprising, a means for coupling said user device through a telecommunication path to said host computer server;

means for encoding and transmitting a plurality of command messages from said user device to said host computer server;

means for receiving and processing said plurality of command messages and for generating in response thereto a plurality of information messages; and, means for receiving and presenting said plurality of information messages at said user device.

53. The system of claim 52, wherein said telecommunications transceiver is selected from among a DTMF or MF signal generator, a modem device, and a voice telecommunication processor.

54. The system of claim 52, wherein means for coupling said user device through a telecommunication path to said host computer server comprises a path selected from among: a telephone wireless channel, a telephone landline, a coaxial cable, an optical cable, a radiowave transceiver or a microwave transceiver.

55. The method of claim 52, further comprising means for monitoring power consumption during said telecommunications between the user device and the host computer server;

means, at said receiving and presenting step, for determining an audio content or a data content of a single information message;

means for power regulating by using said determination of the audio or the data content to reduce the power of a current directed to either the audio system, bar code reader, card reader, or the screen display.

56. A method for information exchange between a server computer and a handheld user device, the method comprising:

providing a server computer that includes a modem for processing digital data, the server computer receiving digital data and voice data via a telecommunications connection;

providing a handheld user device that includes a modem for processing digital data, the handheld user device transmitting digital data and digitally encoded voice data via a telecommunications connection, the handheld user device used by a user as a telephone and as a terminal for a server computer connected to the handheld user device via a telecommunications connection;

in response to input from a user, placing a telephone call from the handheld user device to the server computer; and following connection of the handheld user device to the server, when the user employs the handheld user device to send voice data to the server computer, sending digitally encoded voice data from the handheld user device to the server computer, and when the user employs the handheld user device to send digital data to the server computer, sending the digital data from the handheld user device to the server computer.

57. The method of claim 56 further comprising:

upon receiving the acknowledgement tone from the server computer by the handheld device, and upon connection of the handheld user device to the server, using dual-tone multiple frequency tones transmitted by the handheld user device to conduct a modem negotiation in order to determine parameters for a subsequent information exchange between the server computer and the handheld device.

58. The method of claim 57 wherein the parameters determined during the modem negotiation include the data rate at which information will be exchanged between the server computer and the handheld user device.

59. The method of claim 56 wherein voice data is sent and received by the server computer and the handheld user device as analog voice data.

60. The method of claim 56 wherein voice data is sent and received by the server computer and the handheld user device as digitized voice data encoded in modem packets.

61. The method of claim 56 wherein the handheld user device includes a bar code reader and wherein digital data representing a bar code read from a printed bar code by the bar code reader is sent from the handheld user device to the server computer.

62. The method of claim 56 wherein the handheld user device includes a smart card reader and wherein digital data representing data read from a smart card by the smart card reader is sent from the handheld user device to the server computer.

63. The method of claim 56 wherein the handheld user device includes a magnetic card reader and wherein digital data representing data read from a magnetic card by the magnetic card reader is sent from the handheld user device to the server computer.

64. The method of claim 56, wherein the handheld user device includes a microprocessor, further including:
    prior to sending digital data to the server, encrypting the digital data by the microprocessor.

65. The method of claim 56, wherein the handheld user device includes a display, further including:
    displaying a graphical representation of digital data received by the handheld user device from the server computer on the display of the handheld user device.

66. A handheld user device that exchanges digital data and voice data with a server computer via a telecommunications connection, the handheld user device comprising:
    a modem that processes digital data exchanged with the server computer;
    a telephone used for voice communications and also used to initiate connection with the server computer;
    an input device for inputting data to the handheld user device from an external medium;
    an output device for displaying data; and
    a microprocessor that controls interoperation of the modem, input device, and output device.

67. The handheld user device of claim 66 wherein the handheld user device sends connection configuration information, including the data rate at which information will be exchanged between the server computer and the handheld user device, to the server computer and signals the server computer to begin receiving digitized data using dual-tone multiple frequency signals.

68. The handheld user device of claim 66 wherein voice data is sent and received by the server computer and the handheld user device as analog voice data.

69. The handheld user device of claim 66 wherein voice data is sent and received by the server computer and the handheld user device as digitized voice data encoded in modem packets.

70. The handheld user device of claim 66 wherein the input device is a bar code reader and wherein digital data representing a bar code read from a printed bar code by the bar code reader and sent from the handheld user device to the server computer.

71. The handheld user device of claim 66 wherein the input device is a smart card reader and wherein digital data representing data read from a smart card by the smart card reader is sent from the handheld user device to the server computer.

72. The handheld user device of claim 66 wherein the input device is a magnetic card reader and wherein digital data representing data read from a magnetic card by the magnetic card reader is sent from the handheld user device to the server computer.

73. The handheld user device of claim 66 wherein the modem includes the dual-tone multiple frequency transmitter.

74. The handheld user device of claim 66 wherein the microprocessor encrypts data read from the input device before the data is sent to the server computer by the handheld user device.

75. A power conservation telecommunication method for transmitting a telecommunication signals from a handheld low power user device to a host computer server and for receiving telecommunication signals from the host computer server, said transmitting and receiving over a telecommunication path, said transmitting to issue a command instruction to the host computer server to transmit an informational message for reception by said handheld low power user device,
    wherein said handheld low power user device comprises a low power state in which the handheld low power user device sends or receives said telecommunication signals and a high higher power state in which the handheld low power user device sends and receives said telecommunication signals,
    wherein said handheld low power user device comprises a communication transceiver, a microprocessor and an operator interface selected from among a keypad, display screen, a bar code reader, a card reader, an audio system comprising a speaker and a microphone, and wherein said host computer server comprises a computer processing unit;
    wherein the method comprises the sequential steps of:
        triggering a transition from the first power state to the second power state;
        selecting at said handheld low power user device the command instruction for the informational message and encoding the instruction into the data packet;
        encoding at said handheld low power user device the telecommunication signal and transmitting the telecommunication signal to the host server;
        decoding and processing the telecommunication signal at the host computer to identify said command instruction to transmit said informational message to the handheld low power user device.

76. A power conservation telecommunication method for transmitting a telecommunication signal from a handheld low power user device to a host computer server over a telecommunication path thereby to issue a command instruction to the host computer server to transmit an informational message to said handheld low power user device,
    wherein said handheld low power user device comprises a low power state in which the handheld low power user device does not send said telecommunication signal and a high power state in which the handheld low power user device sends said telecommunication signal,
    wherein said handheld low power user device comprises a communication transceiver, a microprocessor and an operator interface selected from among a keypad, a display screen, a bar code reader, a card reader, an audio system comprising a speaker and a microphone, and wherein said host computer server comprises a computer processing unit;

wherein the method comprises the sequential steps of:
triggering a transition from the first power state to the second power state;
selecting at said handheld low power user device a first command instruction for a first informational message and encoding the first command instruction into the data packet;
encoding at said handheld low power user device the telecommunication signal and transmitting the telecommunication signal to the host server;
decoding and processing the telecommunication signal at the host computer to identify said first command instruction to transmit said first informational message to the handheld low power user device; and
selecting at said handheld low power user device a second command instruction for a second informational message, and repeating the remainder of the sequential steps thereby to receive the second informational message.

77. A power conservation telecommunication method for sending a message data packet from a handheld low power user device to a host computer server over a telecommunication media, wherein said handheld low power user device comprises a low power state in which the handheld low power user device does not send said telecommunication signal and a high power state in which the handheld low power user device sends said telecommunication signal, wherein said handheld low power user device comprises a low power voice and data modem, a microprocessor and an operator interface comprising a keypad, a screen display, a dual power amplifier, a card reader, and a bar code reader;

wherein the host server includes a modem and wherein the method comprises the steps of:
maintaining the user device and the low power voice and data modem in an inactive low power sleep mode;
activating the user device and voice and data modem to said second power state in response to a signal selected from among a keypad key closure signal, a card reader signal, a timer timeout signal, or a valid bar code reader signal;
transmitting from the user device to the host server a digitally encoded data packet;
receiving the digitally encoded data packet at the host server.

* * * * *

UNITED STATES PATENT AND TRADEMARK OFFICE
CERTIFICATE OF CORRECTION

PATENT NO. : 6,144,848
DATED : November 7, 2000
INVENTOR(S) : Joseph F. Walsh and David H. Boydston It is certified that error appears in the above-identified patent and that said Letters Patent is hereby corrected as shown below:

Please delete the referenced Assignee information

Signed and Sealed this

First Day of May, 2001

Attest:

NICHOLAS P. GODICI

Attesting Officer     Acting Director of the United States Patent and Trademark Office